US006013900A

United States Patent [19]

Westerberg et al.

[11] Patent Number: 6,013,900

[45] Date of Patent: Jan. 11, 2000

[54] HIGH EFFICIENCY LIGHTWAVE OVEN

[75] Inventors: Eugene R. Westerberg, Palo Alto; Donald W. Pettibone, Cupertino, both of Calif.

[73] Assignee: Quadlux, Inc., Fremont, Calif.

[21] Appl. No.: 09/060,517

[22] Filed: Apr. 14, 1998

Related U.S. Application Data

[60] Provisional application No. 60/059,754, Sep. 23, 1997.

[51] Int. Cl.[7] .............................. H05B 3/02; A47J 27/00

[52] U.S. Cl. .......................... 219/405; 219/411; 392/422

[58] Field of Search .................................... 219/405, 411; 392/420, 422, 424, 426, 428; 250/492.1, 495.1

[56] References Cited

U.S. PATENT DOCUMENTS

| | | | |
|---|---|---|---|
| D. 245,162 | 7/1977 | Zimmer | D15/108 |
| 500,371 | 6/1893 | Brachhausen et al. . | |
| 793,424 | 6/1905 | Custer . | |
| 2,549,619 | 4/1951 | Miskella | 219/411 |
| 2,559,249 | 7/1951 | Hudson | 219/35 |
| 2,767,297 | 10/1956 | Benson | 219/35 |
| 2,824,943 | 2/1958 | Laughlin | 35/215 |
| 2,864,932 | 12/1958 | Forrer | 219/35 |
| 2,924,695 | 1/1960 | Atkeson | 219/34 |
| 2,939,383 | 6/1960 | Kanaga | 99/327 |
| 2,980,544 | 4/1961 | Mills | 99/229 |
| 3,003,409 | 10/1961 | Mills | 99/331 |
| 3,033,968 | 11/1962 | Julie | 219/20 |
| 3,037,443 | 6/1962 | Newkirk et al. | 99/332 |
| 3,119,000 | 1/1964 | Loch et al. | 219/19 |
| 3,131,280 | 4/1964 | Brussel | 219/411 |
| 3,249,741 | 5/1966 | Mills | 219/388 |
| 3,280,720 | 10/1966 | Kohn | 99/238.5 |
| 3,304,406 | 2/1967 | King | 219/411 |

(List continued on next page.)

FOREIGN PATENT DOCUMENTS

| | | |
|---|---|---|
| 0 023 724 | 2/1981 | European Pat. Off. . |
| 0 215 617 | 9/1986 | European Pat. Off. . |
| 0 332 081 | 9/1989 | European Pat. Off. . |

(List continued on next page.)

OTHER PUBLICATIONS

Fostoria Corp., "Heat Processing with Infrared," Feb. 1962, pp. 1–7.

Summer, W. Dr., "Ultra–Violet and Infra–Red Engineering," 1962, pp. 102–112.

Beggs, E.W., "Quicker Drying With Lamps," Jul. 1939, vol. 97, No. 7, pp. 88–89.

(List continued on next page.)

*Primary Examiner*—Jospeh Pelham
*Attorney, Agent, or Firm*—Limbach & Limbach L.L.P.

[57] ABSTRACT

A lightwave oven that includes an oven cavity housing enclosing a cooking chamber therein, and first and second pluralities of elongated high power lamps. The oven cavity housing includes a top wall with a first non-planar reflecting surface facing the cooking chamber, a bottom wall with a second non-planar reflecting surface facing the cooking chamber, and a sidewall with a third reflecting surface that surrounds and faces the cooking chamber. The sidewall has a cross-section that is either circular, elliptical, or polygonal having at least five planar sides. The first plurality of elongated high power lamps provide radiant energy in the visible, near-visible and infrared ranges of the electromagnetic spectrum and are disposed adjacent to and along the top wall. The second plurality of elongated high power lamps provide radiant energy in the visible, near-visible and infrared ranges of the electromagnetic spectrum and are disposed adjacent to and along the bottom wall. The first and second reflecting surfaces are at least 90% reflective of the radiant energy of the first and second pluralities of lamps, and the third reflecting surface is at least 95% reflective of the radiant energy of the first and second pluralities of lamps. The top and bottom walls include novel reflecting channels or cups that reflect the output from the lamps in a manner to maximize the efficiency and the uniformity of illumination of the cooking chamber.

21 Claims, 11 Drawing Sheets

U.S. PATENT DOCUMENTS

| | | | |
|---|---|---|---|
| 3,313,917 | 4/1967 | Ditzler et al. | 219/400 |
| 3,326,962 | 6/1967 | Martino et al. | 99/328 |
| 3,342,977 | 9/1967 | Anderson | 219/548 |
| 3,364,338 | 1/1968 | Holtkamp | 219/398 |
| 3,414,709 | 12/1968 | Tricault | 219/411 |
| 3,427,435 | 2/1969 | Webb | 219/411 |
| 3,448,678 | 6/1969 | Burstein | 99/386 |
| 3,470,942 | 10/1969 | Fukada et al. | 219/492 |
| 3,559,564 | 2/1971 | Turner et al. | 99/332 |
| 3,569,656 | 3/1971 | White et al. | 219/10.55 B |
| 3,586,823 | 6/1971 | Schier | 219/347 |
| 3,601,582 | 8/1971 | Boisfleury | 219/388 |
| 3,621,200 | 11/1971 | Watts, Jr. | 219/377 |
| 3,626,154 | 12/1971 | Reed | 219/411 |
| 3,626,155 | 12/1971 | Joeckel | 219/411 |
| 3,648,010 | 3/1972 | Schier | 219/214 |
| 3,660,637 | 5/1972 | Grove | 219/413 |
| 3,666,921 | 5/1972 | Shevlin | 219/492 |
| 3,682,643 | 8/1972 | Foster | 219/405 |
| 3,684,860 | 8/1972 | Synder | 219/413 |
| 3,688,084 | 8/1972 | Charneski | 219/537 |
| 3,693,538 | 9/1972 | Synder | 99/447 |
| 3,699,307 | 10/1972 | Malkin | 219/492 |
| 3,713,846 | 1/1973 | Turner et al. | 99/217 |
| 3,719,789 | 3/1973 | Harnden, Jr. . | |
| 3,751,632 | 8/1973 | Kauranen | 219/492 |
| 3,828,163 | 8/1974 | Amagami et al. | 219/413 |
| 3,836,751 | 9/1974 | Anderson | 219/411 |
| 3,847,069 | 11/1974 | Guibert | 219/388 |
| 3,870,806 | 3/1975 | Capossela et al. | 426/221 |
| 3,882,255 | 5/1975 | Gorham, Jr. et al. | 426/235 |
| 3,935,807 | 2/1976 | Main | 99/352 |
| 3,944,807 | 3/1976 | Frantti et al. | 392/432 |
| 3,959,620 | 5/1976 | Stephen, Jr. | 219/405 |
| 4,036,151 | 7/1977 | Shin | 108/20 |
| 4,092,512 | 5/1978 | Suzuki et al. | 219/10.55 |
| 4,101,759 | 7/1978 | Anthony | 219/405 |
| 4,121,078 | 10/1978 | Takano et al. | 219/10.55 |
| 4,164,591 | 8/1979 | Ahlgren et al. | 426/523 |
| 4,164,643 | 8/1979 | Peart et al. | 219/411 |
| 4,191,881 | 3/1980 | Ahlgren et al. | 219/388 |
| 4,210,794 | 7/1980 | Oguri | 219/10.55 |
| 4,225,767 | 9/1980 | Hatanaka et al. | 219/10.55 |
| 4,238,669 | 12/1980 | Huntley | 219/405 |
| 4,238,995 | 12/1980 | Polster | 219/411 |
| 4,244,284 | 1/1981 | Flavan et al. | 99/327 |
| 4,245,148 | 1/1981 | Gisske et al. | 219/492 |
| 4,276,465 | 6/1981 | Flavio | 219/388 |
| 4,323,773 | 4/1982 | Carpenter | 235/473 |
| 4,343,985 | 8/1982 | Wilson et al. | 219/214 |
| 4,360,726 | 11/1982 | Haden | 219/494 |
| 4,363,957 | 12/1982 | Tachikawa et al. | 219/497 |
| 4,367,388 | 1/1983 | Ishihara et al. | 219/10.55 B |
| 4,374,319 | 2/1983 | Guibert | 219/405 |
| 4,379,964 | 4/1983 | Kanazawa et al. | 219/492 |
| 4,396,817 | 8/1983 | Eck et al. | 426/523 |
| 4,401,884 | 8/1983 | Kusunoki et al. | 426/243 |
| 4,410,779 | 10/1983 | Weiss | 219/10.55 |
| 4,421,015 | 12/1983 | Masters et al. | 99/400 |
| 4,421,974 | 12/1983 | Oota et al. | 219/492 |
| 4,441,015 | 4/1984 | Eichelberger et al. | 219/411 |
| 4,455,479 | 6/1984 | Itoh et al. | 219/405 |
| 4,462,307 | 7/1984 | Wells | 99/386 |
| 4,463,238 | 7/1984 | Tanabe | 219/10.55 B |
| 4,468,260 | 8/1984 | Hiramoto | 219/411 |
| 4,481,405 | 11/1984 | Malick | 219/405 |
| 4,483,631 | 11/1984 | Kydd | 364/557 |
| 4,486,639 | 12/1984 | Mittelsteadt | 219/10.55 B |
| 4,493,960 | 1/1985 | Mittelsteadt et al. | 219/405 |
| 4,501,944 | 2/1985 | Matsushima | 219/10.55 |
| 4,506,652 | 3/1985 | Baker | 219/388 |
| 4,508,960 | 4/1985 | Arai | 219/388 |
| 4,511,788 | 4/1985 | Arai et al. | 219/405 |
| 4,516,486 | 5/1985 | Burkhart | 99/388 |
| 4,554,437 | 11/1985 | Wagner et al. | 219/388 |
| 4,561,907 | 12/1985 | Raicu | 148/187 |
| 4,565,704 | 1/1986 | Dagerskog | 426/233 |
| 4,575,616 | 3/1986 | Bergendal | 219/405 |
| 4,588,923 | 5/1986 | Hoegler et al. | 313/579 |
| 4,598,194 | 7/1986 | Halberstadt et al. | 219/464 |
| 4,601,004 | 7/1986 | Holt et al. | 364/557 |
| 4,663,557 | 5/1987 | Martin, Jr.et al. | 313/112 |
| 4,680,451 | 7/1987 | Gat et al. . | |
| 4,687,895 | 8/1987 | Chitre et al. | 219/10.55 B |
| 4,692,597 | 9/1987 | Tsuda et al. | 219/492 |
| 4,700,051 | 10/1987 | Goessler et al. | 219/464 |
| 4,701,663 | 10/1987 | Kawakatsu et al. | 313/112 |
| 4,721,877 | 1/1988 | Kawakatsu et al. | 131/111 |
| 4,728,763 | 3/1988 | Bell et al. | 219/10.55 |
| 4,731,251 | 3/1988 | Javanovic | 219/405 X |
| 4,734,562 | 3/1988 | Amano et al. | 219/413 |
| 4,761,529 | 8/1988 | Tsisios | 219/10.55 B |
| 4,771,154 | 9/1988 | Bell et al. | 219/405 |
| 4,808,798 | 2/1989 | Goessler et al. | 219/464 |
| 4,816,635 | 3/1989 | Edamura | 219/10.55 |
| 4,836,138 | 6/1989 | Robinson et al. | 118/666 |
| 4,871,559 | 10/1989 | Dunn et al. | 426/248 |
| 4,894,518 | 1/1990 | Ishikawa | 219/413 |
| 4,910,942 | 3/1990 | Dunn et al. | 53/425 |
| 4,949,005 | 8/1990 | Parham et al. | 313/112 |
| 4,960,977 | 10/1990 | Alden | 219/388 |
| 4,976,194 | 12/1990 | Kelterborn et al. | 99/328 |
| 4,983,001 | 1/1991 | Haginda et al. | 350/1.6 |
| 4,999,468 | 3/1991 | Fadel | 219/10.55 B |
| 5,034,235 | 7/1991 | Dunn et al. | 426/238 |
| 5,036,179 | 7/1991 | Westerberg et al. | 219/411 |
| 5,038,395 | 8/1991 | Lenski | 392/420 |
| 5,039,535 | 8/1991 | Lang et al. | 426/233 |
| 5,097,112 | 3/1992 | Kanaya et al. | 219/411 |
| 5,108,792 | 4/1992 | Anderson et al. | 118/725 |
| 5,134,263 | 7/1992 | Smith et al. | 219/10.55 |
| 5,138,219 | 8/1992 | Krisl et al. | 313/112 |
| 5,147,068 | 9/1992 | Wright | 221/9 |
| 5,157,239 | 10/1992 | Kanaya et al. | 219/411 |
| 5,164,161 | 11/1992 | Feathers et al. | 422/109 |
| 5,171,974 | 12/1992 | Koether et al. | 219/506 |
| 5,179,265 | 1/1993 | Sheridan et al. | 219/497 |
| 5,182,439 | 1/1993 | Burkett et al. | 219/492 |
| 5,183,997 | 2/1993 | Lotz . | |
| 5,285,041 | 2/1994 | Wright . | |
| 5,308,161 | 5/1994 | Stein . | |
| 5,315,092 | 5/1994 | Takahashi et al. . | |
| 5,317,130 | 5/1994 | Burkett et al. | 219/492 |
| 5,319,171 | 6/1994 | Tazawa | 219/705 |
| 5,352,865 | 10/1994 | Burkett et al. | 219/492 |
| 5,373,778 | 12/1994 | Moreth | 99/421 |
| 5,378,872 | 1/1995 | Jovanovic | 219/405 |
| 5,382,144 | 1/1995 | Lentz et al. | 436/411 |
| 5,390,588 | 2/1995 | Krasznai et al. | 99/389 |
| 5,396,047 | 3/1995 | Schilling et al. . | |
| 5,404,420 | 4/1995 | Song | 392/416 |
| 5,420,401 | 5/1995 | Jacquault et al. . | |
| 5,422,460 | 6/1995 | Bralia et al. | 392/422 |
| 5,471,914 | 12/1995 | Krasznai et al. | 99/389 |
| 5,478,986 | 12/1995 | Westerberg | 219/411 |
| 5,517,005 | 5/1996 | Westerberg | 219/405 |
| 5,534,679 | 7/1996 | Beaver, II et al. . | |
| 5,560,285 | 10/1996 | Moreth | 99/421 |
| 5,567,459 | 10/1996 | Gonzalez-Hernandez et al. | 426/241 |
| 5,620,624 | 4/1997 | Westerburg | 219/411 |
| 5,665,259 | 9/1997 | Westerberg | 219/411 |
| 5,674,421 | 10/1997 | Beaver, II et al. | 219/385 |

| | | | |
|---|---|---|---|
| 5,695,668 | 12/1997 | Boddy . | |
| 5,695,669 | 12/1997 | Westerberg | 219/411 |
| 5,712,464 | 1/1998 | Westerberg | 219/411 |
| 5,726,423 | 3/1998 | Westerberg et al. | 219/411 |
| 5,736,713 | 4/1998 | Westerberg | 219/411 |
| 5,786,569 | 7/1998 | Westerberg | 219/411 |

FOREIGN PATENT DOCUMENTS

| | | |
|---|---|---|
| 0 455 168 A2 | 6/1991 | European Pat. Off. . |
| 25 46 106 | 4/1977 | Germany . |
| 35 03 648 | 4/1986 | Germany . |
| 34 42 804 A1 | 6/1986 | Germany . |
| 52-112146 | 9/1977 | Japan . |
| 54-1597 | 7/1980 | Japan . |
| 55-119391 | 9/1980 | Japan . |
| 55-86451 | 1/1981 | Japan . |
| 57-60007 | 4/1982 | Japan . |
| 57-70323 | 4/1982 | Japan . |
| 59-1930 | 1/1984 | Japan . |
| 59-47302 | 3/1984 | Japan . |
| 59-210228 | 11/1984 | Japan . |
| 60-37116 | 2/1985 | Japan . |
| 60-69920 | 5/1985 | Japan . |
| 60-167932 | 11/1985 | Japan . |
| 60-245933 | 12/1985 | Japan . |
| 61-115226 | 2/1988 | Japan . |
| 63-34913 | 3/1988 | Japan . |
| 63-46720 | 3/1988 | Japan . |
| 63-49405 | 4/1988 | Japan . |
| 1-154483 | 6/1989 | Japan . |
| 1-315982 | 12/1989 | Japan . |
| 2-89921 | 3/1990 | Japan . |
| 4-080523 | 3/1992 | Japan . |
| 4-361714 | 12/1992 | Japan . |
| 88-717 | 4/1985 | Rep. of Korea . |
| 569 419 | 11/1975 | Switzerland . |
| 1155223 | 5/1985 | U.S.S.R. . |
| 1215651 | 3/1986 | U.S.S.R. . |
| 839551 | 6/1960 | United Kingdom . |
| 1273023 | 5/1972 | United Kingdom . |
| 2132060 | 8/1983 | United Kingdom . |
| 2147788 | 5/1985 | United Kingdom . |
| 2152790 | 8/1985 | United Kingdom . |
| 2180637 | 4/1987 | United Kingdom . |
| 2245136 | 1/1992 | United Kingdom . |
| WO 88/03369 | 5/1988 | WIPO . |
| WO 94/10857 | 5/1994 | WIPO . |
| WO 95/12962 | 5/1995 | WIPO . |

OTHER PUBLICATIONS

Harold McGee, Book, "On Food and Cooking," Charles Schribner's Sons, New York, 1984, chapter 14, pp. 608–624.

Hidemi Sato et al., "Effects Of Radiative Characteristics Of Heaters On Crust Formation And Coloring Processes Of Food Surface," Nippon Shokuhin Kagaku Kogaku Kaishi, vol. 42, No. 9, pp. 643–648, (1995).

HIGH EFFICIENCY LIGHTWAVE OVEN

This application claims benefit of provisional application No. 60/059,754, filed Sep. 23, 1997.

FIELD OF THE INVENTION

This invention relates to the field of cooking ovens. More particularly, this invention relates to an improved lightwave oven configuration for cooking with radiant energy in the electromagnetic spectrum including the infrared, near-visible and visible ranges.

BACKGROUND OF THE INVENTION

Ovens for cooking and baking food have been known and used for thousands of years. Basically, oven types can be categorized in four cooking forms; conduction cooking, convection cooking, infrared radiation cooking and microwave radiation cooking.

There are subtle differences between cooking, and baking. Cooking just requires the heating of the food. Baking of a product from a dough, such as bread, cake, crust, or pastry, requires not only heating of the product throughout but also chemical reactions coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infrared radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because the radiant energy couples into the bipolar water molecules causing them to rotate. Viscous coupling between water molecules converts this rotational energy into thermal energy, thereby heating the food. Decreasing the wavelength to the long-wave infrared regime, the molecules and their component atoms resonantly absorb the energy in well-defined excitation bands. This is mainly a vibrational energy absorption process. In the short wave infrared region of the spectrum, the main part of the absorption is due to higher frequency coupling to the vibrational modes. In the visible region, the principal absorption mechanism is excitation of the electrons that couple the atoms to form the molecules. These interactions are easily discerned in the visible band of the spectra, where they are identified as "color" absorptions Finally, in the ultraviolet, the wavelength is short enough, and the energy of the radiation is sufficient to actually remove the electrons from their component atoms, thereby creating ionized states and breaking chemical bonds. This short wavelength, while it finds uses in sterilization techniques, probably has little use in foodstuff heating, because it promotes adverse chemical reactions and destroys food molecules.

Lightwave ovens are capable of cooking and baking food products in times much shorter than conventional ovens. This cooking speed is attributable to the range of wavelengths and power levels that are used.

There is no precise definition for the visible, near-visible and infrared ranges of wavelengths because the perceptive ranges of each human eye is different. Scientific definitions of the "visible" light range, however, typically encompass the range of about 0.39 $\mu$m to 0.77 $\mu$m. The term "near-visible" has been coined for infrared radiation that has wavelengths longer than the visible range, but less than the water absorption cut-off at about 1.35 $\mu$m. The term "infrared" refers to wavelengths greater than about 1.35 $\mu$m. For the purposes of this disclosure, the visible region includes wavelengths between about 0.39 $\mu$m and 0.77 $\mu$m, the near-visible region includes wavelengths between about 0.77 $\mu$m and 1.35 $\mu$m, and the infrared region includes wavelengths greater than about 1.35 $\mu$m.

Typically, wavelengths in the visible range (0.39 to 0.77 $\mu$m) and the near-visible range (0.77 to 1.35 $\mu$m) have fairly deep penetration in most foodstuffs. This range of deep penetration is mainly governed by the absorption properties of water. The characteristic penetration distance for water varies from about 50 meters in the visible to less than about 1 mm at 1.35 microns. Several other factors modify this basic absorption penetration. In the visible region electronic absorption of the food molecules reduces the penetration distance substantially, while scattering in the food product can be a strong factor throughout the region of deep penetration. Measurements show that the typical average penetration distances for light in the visible and near-visible region of the spectrum varies from 2–4 mm for meats to as deep as 10 mm in some baked goods and liquids like non-fat milk.

The region of deep penetration allows the radiant power density that impinges on the food to be increased, because the energy is deposited in a fairly thick region near the surface of the food, and the energy is essentially deposited in a large volume, so that the temperature of the food at the surface does not increase rapidly. Consequently the radiation in the visible and near-visible regions does not contribute greatly to the exterior surface browning.

In the region above about 1.35 $\mu$m (infrared region), the penetration distance decreases substantially to fractions of a millimeter, and for certain absorption peaks down to 0.001 mm. The power in this region is absorbed in such a small depth that the temperature rises rapidly, driving the water out and forming a crust. With no water to evaporate and cool the surface the temperature can climb quickly to 300° F. This is the approximate temperature where the set of browning reactions (Maillard reactions) are initiated. As the temperature is rapidly pushed even higher to above 400° F. the point is reached where the surface starts to burn.

It is the balance between the deep penetration wavelengths (0.39 to 1.35 $\mu$m) and the shallow penetration wavelengths (1.35 $\mu$m and greater) that allows the power density at the surface of the food to be increased in the lightwave oven, to cook the food rapidly with the shorter wavelengths and to brown the food with the longer infrared so that a high-quality product is produced. Conventional ovens do not have the shorter wavelength components of radiant energy. The resulting shallower penetration means that increasing the radiant power in such an oven only heats the food surface faster, prematurely browning the food before its interior gets hot.

It should be noted that the penetration depth is not uniform across the deeply penetrating region of the spectrum. Even though water shows a very deep penetration for visible radiation, i.e., many meters, the electronic absorptions of the food macromolecules generally increase in the visible region. The added effect of scattering near the blue end (0.39 μm) of the visible region reduces the penetration even further. However, there is little real loss in the overall average penetration because very little energy resides in the blue end of the blackbody spectrum.

Conventional ovens operate with radiant power densities as high as about 0.3 W/cm$^2$ (i.e. at 400° F.). The cooking speeds of conventional ovens cannot be appreciably increased simply by increasing the cooking temperature, because increased cooking temperatures drive water off the food surface and cause browning and searing of the food surface before the food's interior has been brought up to the proper temperature. In contrast, lightwave ovens have been operated from approximately 0.8 to 5 W/cm$^2$ of visible, near-visible and infrared radiation, which results in greatly enhanced cooking speeds. The lightwave oven energy penetrates deeper into the food than the radiant energy of a conventional oven, thus cooking the food interior faster. Therefore, higher power densities can be used in a lightwave oven to cook food faster with excellent quality. For example, at about 0.7 to 1.3 W/cm$^2$, the following cooking speeds have been obtained using a lightwave oven:

| Food | Cook Time |
|---|---|
| pizza | 4 minutes |
| steaks | 4 minutes |
| biscuits | 7 minutes |
| cookies | 11 minutes |
| vegetables (asparagus) | 4 minutes |

For high-quality cooking and baking, the applicants have found that a good balance ratio between the deeply penetrating and the surface heating portions of the impinging radiant energy is about 50:50, i.e., Power(0.39 to 1.35 μm)/Power(1.35 m and greater)≈1. Ratios higher than this value can be used, and are useful in cooking especially thick food items, but radiation sources with these high ratios are difficult and expensive to obtain. Fast cooking can be accomplished with a ratio substantially below 1, and it has been shown that enhanced cooking and baking can be achieved with ratios down to about 0.5 for most foods, and lower for thin foods, e.g., pizza and foods with a large portion of water, e.g., meats. Generally the surface power densities must be decreased with decreasing power ratio so that the slower speed of heat conduction can heat the interior of the food before the outside burns. It should be remembered that it is generally the burning of the outside surface that sets the bounds for maximum power density that can be used for cooking. If the power ratio is reduced below about 0.3, the power densities that can be used are comparable with conventional cooking and no speed advantage results.

If blackbody sources are used to supply the radiant power, the power ratio can be translated into effective color temperatures, peak intensities, and visible component percentages. For example, to obtain a power ratio of about 1, it can be calculated that the corresponding blackbody would have a temperature of 3000° K, with a peak intensity at 0.966 μm and with 12% of the radiation in the visible range of 0.39 to 0.77 μm. Tungsten halogen quartz bulbs have spectral characteristics that follow the blackbody radiation curves fairly closely. Commercially available tungsten halogen bulbs have successfully been used with color temperatures as high as 3400° K. Unfortunately, the lifetime of such sources falls dramatically at high color temperatures (at temperatures above 3200° K it is generally less that 100 hours). It has been determined that a good compromise in bulb lifetime and cooking speed can be obtained for tungsten halogen bulbs operated at about 2900–3000° K. As the color temperature of the bulb is reduced and more shallow-penetrating infrared is produced, the cooking and baking speeds are diminished for quality product. For most foods there is a discernible speed advantage down to about 2500° K (peak at about 1.2 μm; visible component of about 5.5%) and for some foods there is an advantage at even lower color temperatures. In the region of 2100° K the speed advantage vanishes for virtually all foods that have been tried.

For rectangular-shaped commercial lightwave ovens using polished, high-purity aluminum reflective walls, it has been determined that about 4 kilowatts of lamp power is necessary for a lightwave oven to have a reasonable cooking speed advantage over a conventional oven. Four kilowatts of lamp power can operate four commercially available tungsten halogen lamps, at a color temperature of about 3000° K, to produce a power density of about 0.6–1.0 W/cm$^2$ inside the oven cavity. This power density has been considered near the minimum value necessary for the lightwave oven to clearly outperform a conventional oven.

There is a need for a kitchen counter-top lightwave oven that plugs into a standard 120 VAC outlet. However, a typical home kitchen outlet can only supply 15 amps of electrical current, which corresponds to about 1.8 KW of power. This amount of power, which is sufficient to operate only two tungsten halogen lamps at a color temperature of about 2900° K, is well below the 4 KW of lamp power previously deemed sufficient to cook food with speeds and food quality significantly superior to a conventional oven. Two such lamps operating at about 1.8 KW only produce a power density of about 0.3–0.45 W/cm$^2$ inside the rectangular-shaped oven cavity.

SUMMARY OF THE INVENTION

It is an object of the present invention to provide a lightwave oven that operates with commercially available tungsten-halogen quartz lamps using a standard kitchen 120 VAC, 15 amp power outlet, and to provide a power density inside the oven cavity that cooks foods significantly faster than conventional ovens.

It is another object of the present invention to provide uniform cooking in the lightwave oven.

It is yet another object of the present invention to provide a means of cooking and baking directly on an internal cooktop using both visible, near-visible and infrared radiation from all sides, and conducted heat energy from the bottom side.

It has been discovered that a uniform time-average power density of about 0.7 W/cm$^2$ in a lightwave oven cavity is achievable using only two 1.0 KW, 120 VAC tungsten halogen quartz bulbs consuming about 1.8 KW of power at any one time and operating at a color temperature of about 2900° K. The dramatic increase in power density is achievable by making a relatively small change in the reflectivity of the oven wall materials, and by changing the geometry of the oven to provide a novel reflecting cavity. Uniform cooking of foodstuffs is achieved by using novel reflectors adjacent to the lamps. The oven of the present invention includes an internal cooktop.

In one aspect of the present invention, the lightwave oven includes an oven cavity housing that encloses a cooking chamber therein, and first and second pluralities of elongated high power lamps. The oven cavity housing includes a top wall with a first non-planar reflecting surface facing the cooking chamber, a bottom wall with a second non-planar reflecting surface facing the cooking chamber, and a sidewall with a third reflecting surface that surrounds and faces the cooking chamber. The first plurality of elongated high power lamps provide radiant energy in the visible, near-visible and infrared ranges of the electromagnetic spectrum and are disposed adjacent to and along the top wall. The second plurality of elongated high power lamps provide radiant energy in the visible, near-visible and infrared ranges of the electromagnetic spectrum and are disposed adjacent to and along the bottom wall.

In another aspect of the present invention, the lightwave oven includes an oven cavity housing enclosing a cooking chamber therein, and first and second pluralities of elongated high power lamps. The oven cavity housing, includes a top wall with a first non-planar reflecting surface facing the cooking chamber, a bottom wall with a second non-planar reflecting surface facing the cooking chamber, and a sidewall with a third reflecting surface that surrounds and faces the cooking chamber. The sidewall has a cross-section that is either circular, elliptical, or polygonal having at least five planar sides. The first plurality of elongated high power lamps provide radiant energy in the visible, near-visible and infrared ranges of the electromagnetic spectrum and are disposed adjacent to and along the top wall. The second plurality of elongated high power lamps provide radiant energy in the visible, near-visible and infrared ranges of the electromagnetic spectrum and are disposed adjacent to and along the bottom wall. The first and second reflecting surfaces are at least substantially 90% reflective of the radiant energy of the first and second pluralities of lamps, and the third reflecting surface is at least substantially 95% reflective of the radiant energy of the first and second pluralities of lamps.

Other objects and features of the present invention will become apparent by a review of the specification, claims and appended figures.

DETAILED DESCRIPTION OF THE PREFERRED EMBODIMENT

The invention being described herein is the result of the discovery that the efficiency of the oven is increased dramatically by making only a small relative change in the reflectivity of the oven wall materials, and by changing the geometry of the oven to provide a novel reflecting cavity. With the increased oven efficiency, the cooking effect of about 1.8 KW of available power from a standard 120 VAC kitchen outlet is equivalent to the cooking effect from almost 4 KW in a conventional lightwave oven. Novel reflectors adjacent the lamps provide even distribution of power to the foodstuff. Sequential lamp operation allows for efficient and uniform cooking when the available electrical power is insufficient to operate all of the lamps.

Figure 1A:
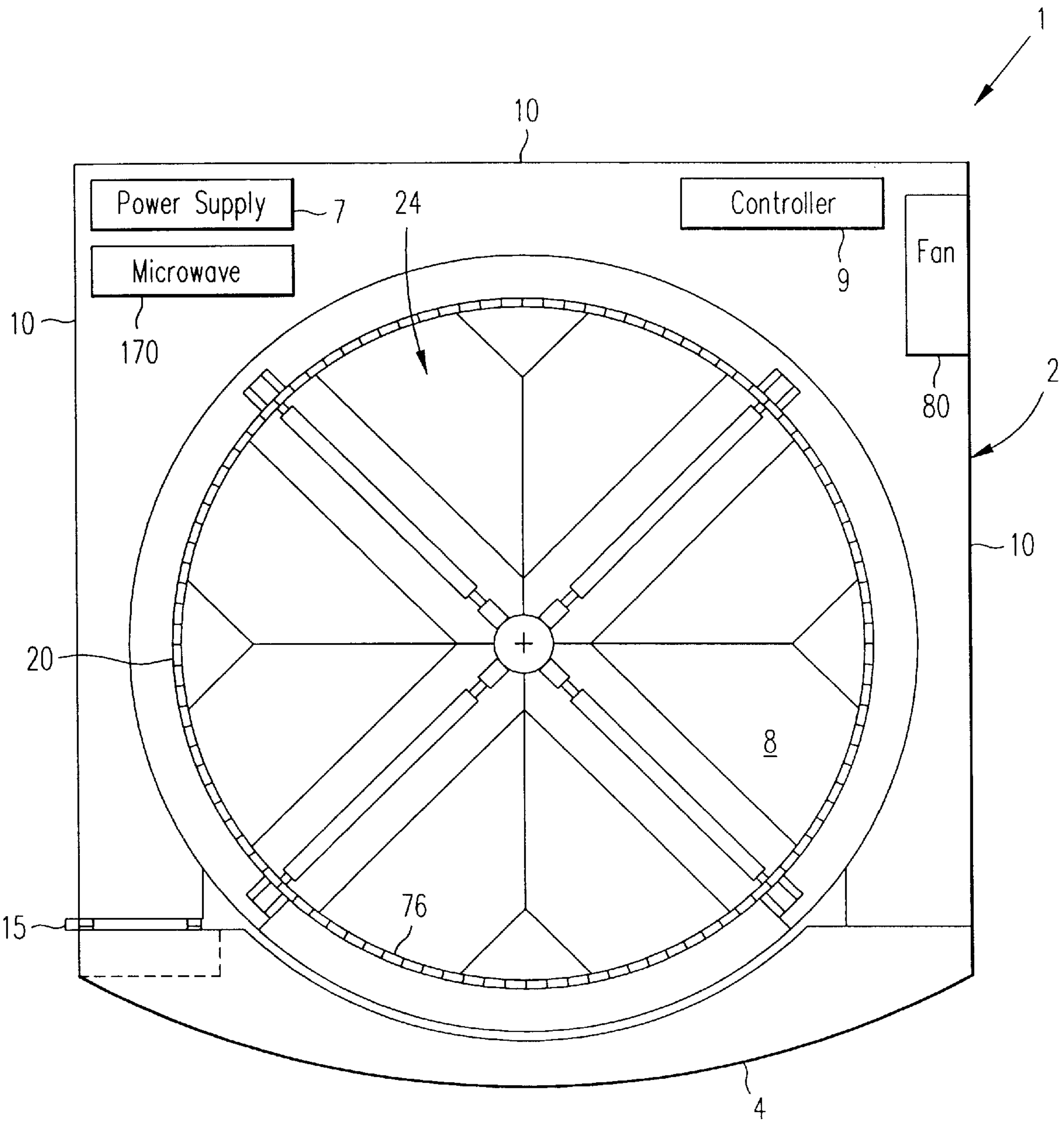
FIG. 1A is a top cross-sectional view of the lightwave oven of the present invention.
Figure 1B:
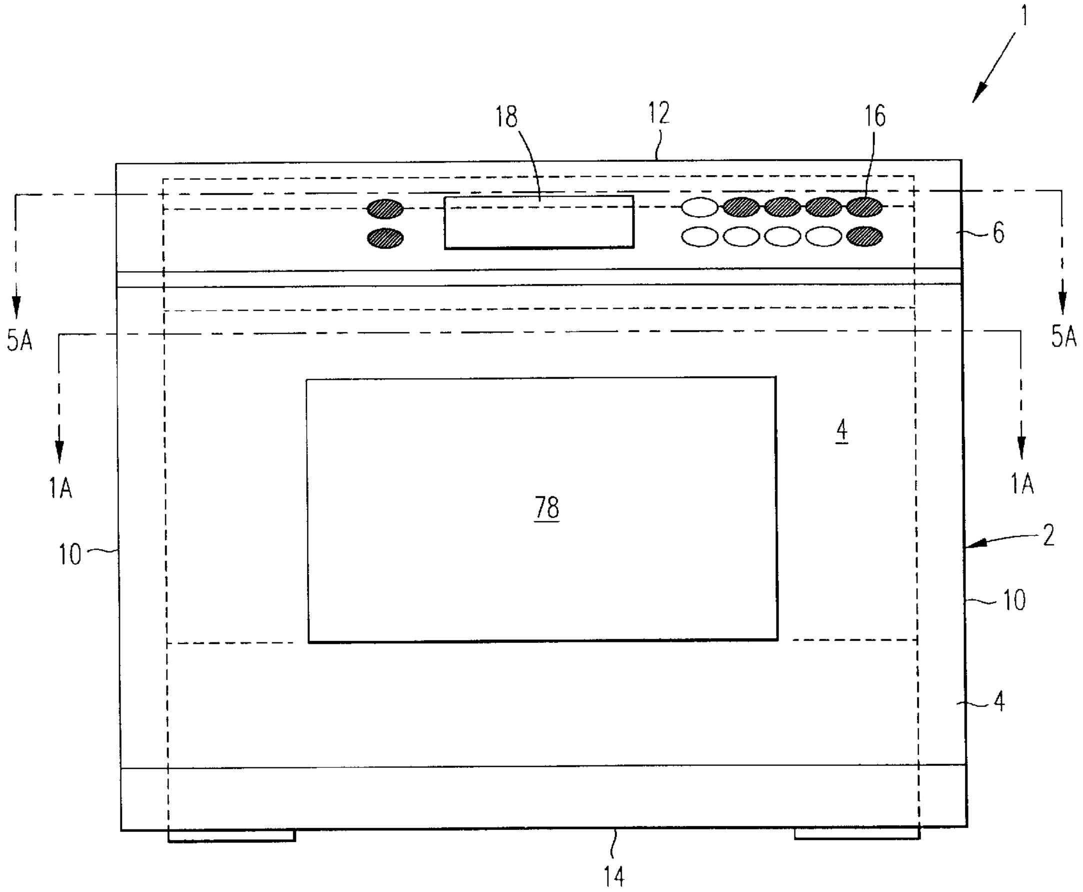
FIG. 1B is a front view of the lightwave oven of the present invention.
Figure 1C:
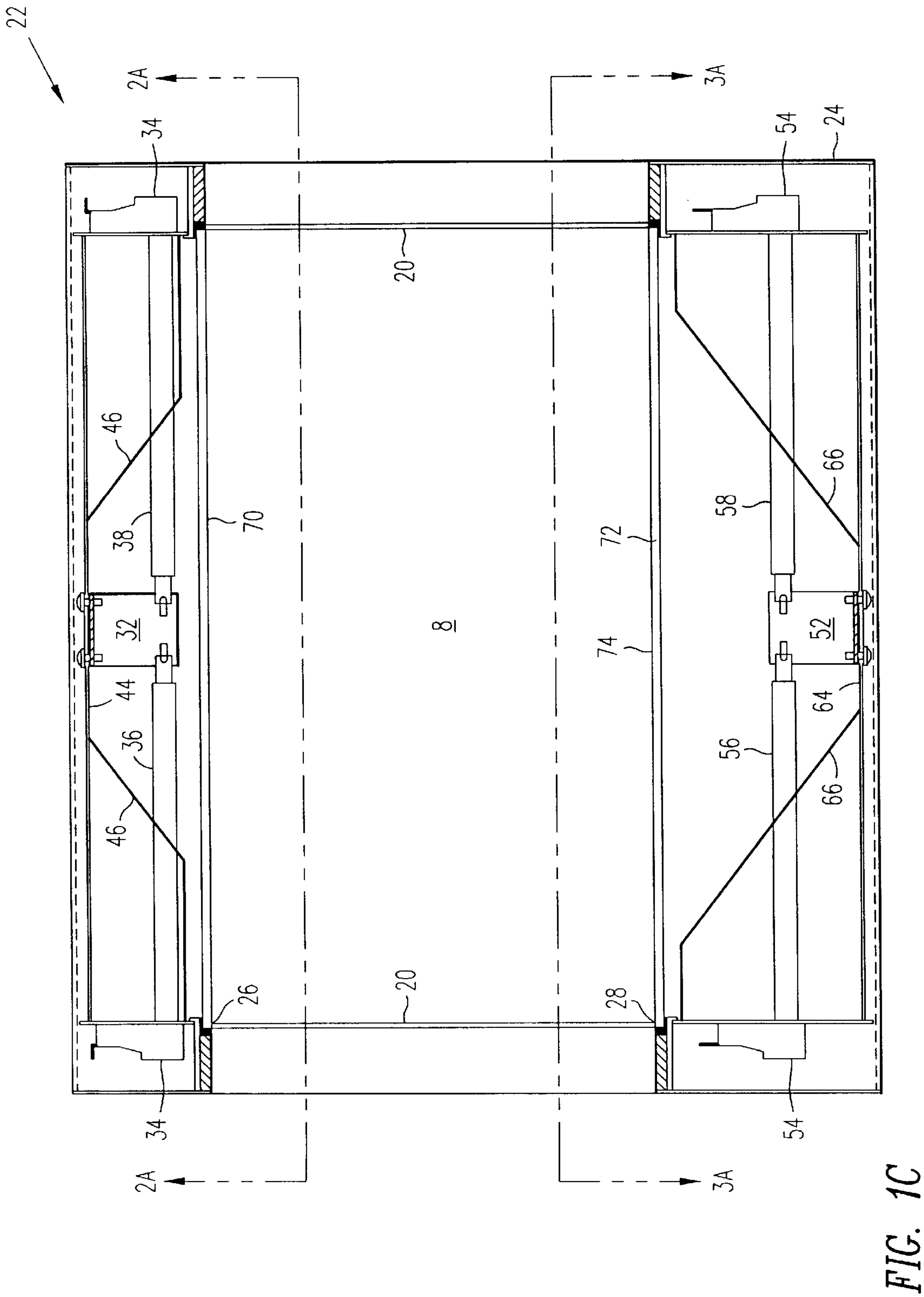
FIG. 1C is a side cross-sectional view of the lightwave oven of the present invention.

The cylindrical-shaped lightwave oven of the present invention is illustrated in FIGS. 1A–1C. The lightwave oven 1 includes a housing 2, a door 4, a control panel 6, a power supply 7, an oven cavity 8, and a controller 9.

The housing 2 includes sidewalls 10, top wall 12, and bottom wall 14. The door 4 is rotatably attached to one of the sidewalls 10 by hinges 15. Control panel 6, located above the door 4 and connected to controller 9, contains several operation keys 16 for controlling the lightwave oven 1, and a display 18 indicating the oven's mode of operation.

The oven cavity 8 is defined by a cylindrical-shaped sidewall 20, an upper reflector assembly 22 at an upper end 26 of sidewall 20, and a lower reflector assembly 24 at the lower end 28 of sidewall 20.

Figure 2B:
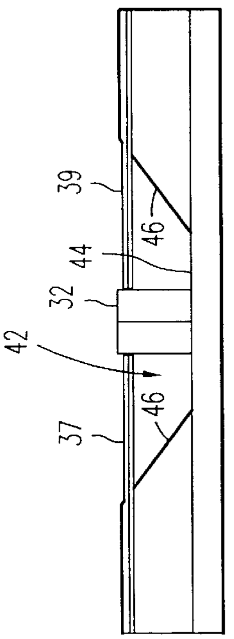
FIG. 2B is a side cross-sectional view of the upper reflector assembly of the present invention.
Figure 2A:
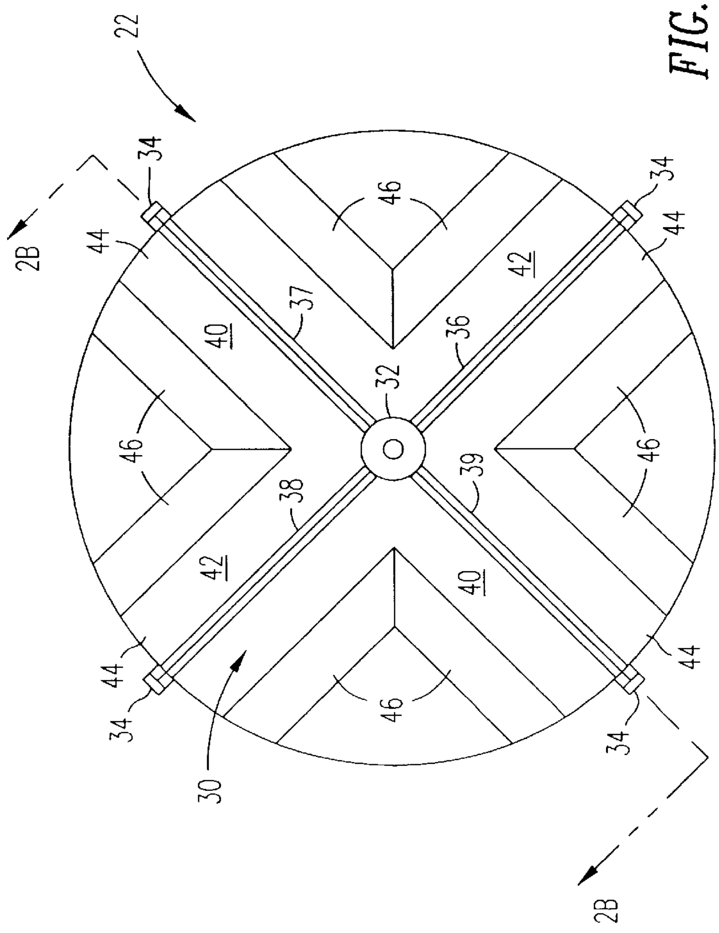
FIG. 2A is a bottom view of the upper reflector assembly of the present invention.
Figure 2C:
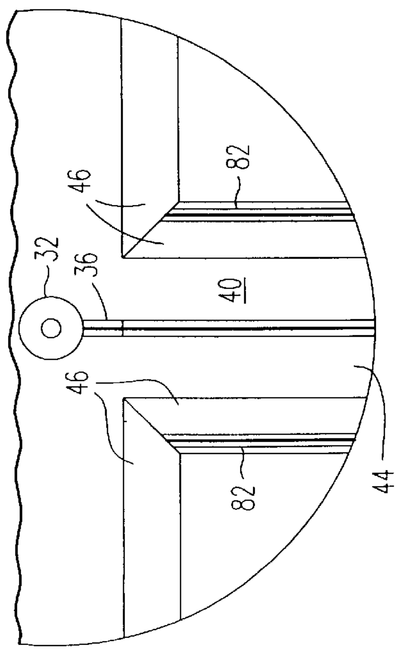
FIG. 2C is a partial bottom view of the upper reflector assembly of the present invention illustrating the virtual images of one of the lamps.

Upper reflector assembly 22 is illustrated in FIGS. 2A–2C and includes a circular, non-planar reflecting surface 30 facing the oven cavity 8, a center electrode 32 disposed at the center of the reflecting surface 30, four outer electrodes 34 evenly disposed at the perimeter of the reflecting surface 30, and four upper lamps 36, 37, 38, 39 each radially extending from the center electrode to one of the outer electrodes 34 and positioned at 90 degrees to the two adjacent lamps. The reflecting surface 30 includes a pair of linear channels 40 and 42 that cross each other at the center of the reflecting surface 30 at an angle of 90 degrees to each other. The lamps 36–39 are disposed inside of or directly over channels 40/42. The channels 40/42 each have a bottom reflecting wall 44 and a pair of opposing planar reflecting sidewalls 46 extending parallel to axis of the corresponding lamp 36–39. (Note that for bottom reflecting wall 44, "bottom" relates to its relative position with respect to channels 40/42 in their abstract, even though when installed wall 44 is above sidewalls 46.) Opposing sidewalls 46 of each channel 40/42 slope away from each other as they extend away from the bottom wall 44, forming an approximate angle of 45 degrees to the plane of the upper cylinder end 26.

Figure 3B:
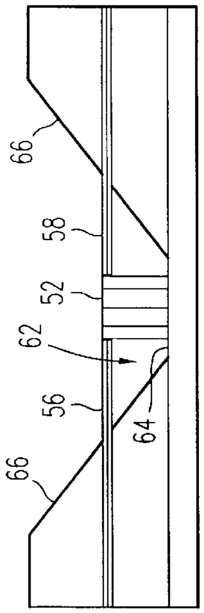
FIG. 3B is a side cross-sectional view of the lower reflector assembly of the present invention.
Figure 3A:
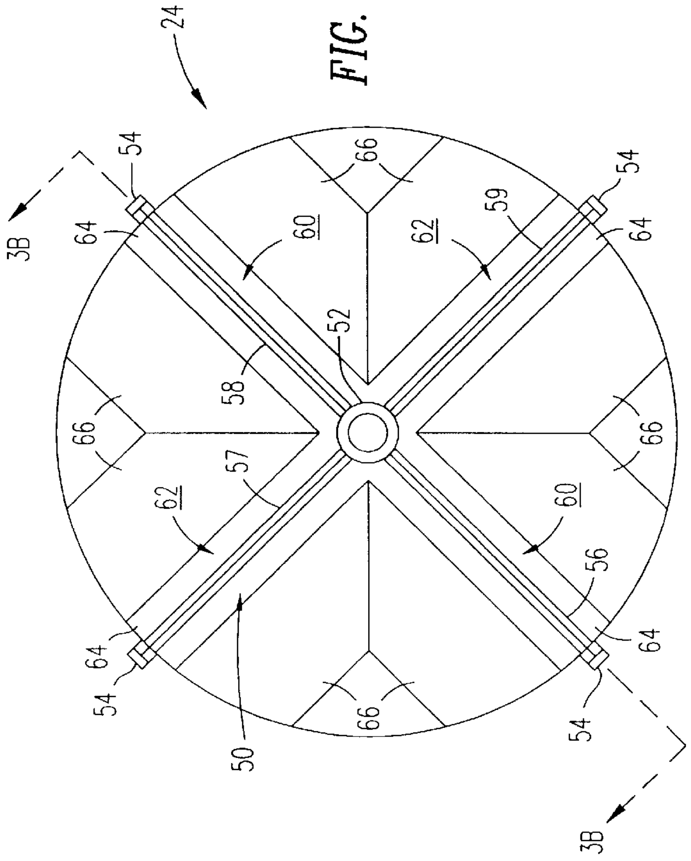
FIG. 3A is a top view of the lower reflector assembly of the present invention.
Figure 3C:
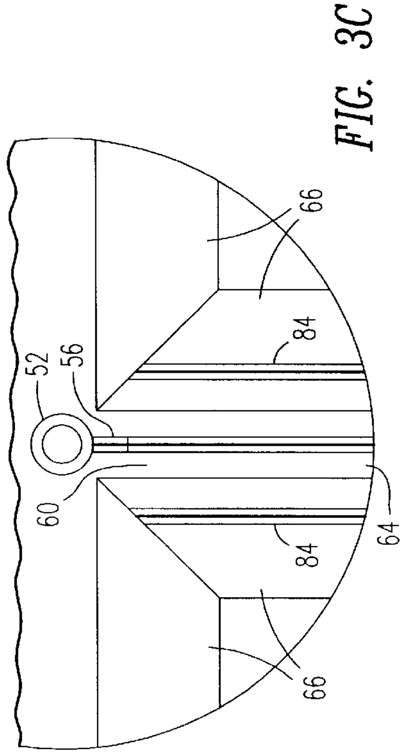
FIG. 3C is a partial top view of the lower reflector assembly of the present invention illustrating the virtual images of one of the lamps.

Lower reflector assembly 24 illustrated in FIGS. 3A–3C has a similar construction as upper reflector 22, with a circular, non-planar reflecting surface 50 facing the oven cavity 8, a center electrode 52 disposed at the center the reflecting surface 50, four outer electrodes 54 evenly disposed at the perimeter of the reflecting surface 50, and four lower lamps 56, 57, 58, 59 each radially extending from the center electrode to one of the outer electrodes 54 and positioned at 90 degrees to the two adjacent lamps. The reflecting surface 50 includes a pair of linear channels 60 and 62 that cross each other at the center of the reflecting surface 50 at an angle of 90 degrees to each other. The lamps 56–59 are disposed inside of or directly over channels 60/62. The channels 60/62 each have a bottom reflecting wall 64 and a pair of opposing planar reflecting sidewalls 66 extending parallel to axis of the corresponding lamp 56–59. Opposing, sidewalls 66 of each channel 60/62 slope away from each other as they extend away from the bottom wall 64, forming an approximate angle of 45 degrees to the plane of the lower cylinder end 28.

Power supply 7 is connected to electrodes 32, 34, 52 and 54 to operate, under the control of controller 9, each of the lamps 36–39 and 56–59 individually.

To keep foods from splattering cooking juices onto the lamps and reflecting surfaces 30/50, transparent upper and lower shields 70 and 72 are placed at the cylinder ends 26/28 covering the upper/lower reflector assemblies 22/24 respectively. Shields 70/72 are plates made of a glass or a glass-ceramic material that has a very small thermal expansion coefficient. For the preferred embodiment glass-ceramic material available under the trademarks Pyroceram, Neoceram and Robax, and the borosilicate glass material available under the name Pyrex, have been successfully used. These lamp shields isolate the lamps and reflecting surfaces 30/50 so that drips, food splatters and food spills do not affect operation of the oven, and they are easily cleaned since each shield 70/72 consists of a single, circular plate of glass or glass-ceramic material.

While food is usually cooked in glass or metal cookware placed on the lower shield 72, it has been discovered that glass or glass-ceramic materials not only work well as a lamp shield, but also provide an effective surface to cook and bake upon. Therefore, the upper surface 74 of lower shield 72 serves as a cooktop. There are several advantages to providing such a cooking surface within the oven cavity. First, food can be placed directly on the cooktop 74 without the need for pans, plates or pots. Second, the radiation transmission properties of glass and glass-ceramic change rapidly at wavelengths near the range of 2.5 to 3.0 microns. For wavelengths below this range, the material is very transparent and above this range it is very absorptive. This means that the deeply penetrating visible and near-visible radiation can impinge directly on the foodstuff from all sides, while the longer infrared radiation is partially absorbed in the shields 70/72, heating them and thereby indirectly heating foodstuff in contact with surface 74 of shield 72. The conduction of the heat within the shield 72 evens out the temperature distribution in the shield and causes uniform heating of the foodstuff, which results in superior uniformity of food browning compared to radiation alone. Third, because the heating of the foodstuff is accomplished with no utensils, the cook times are generally shorter, since extra energy is not expended on heating the utensils. Typical foods that have been cooked and baked directly on cooktop 74 include pizza, cookies, biscuits, french fries, sausages, and chicken breasts.

Upper and lower lamps 36–39 and 56–59 are generally any of the quartz body, tungsten-halogen or high intensity discharge lamps commercially available, e.g., 1 KW 120 VAC quartz-halogen lamps. The oven according to the preferred embodiment utilizes eight tungsten-halogen quartz lamps, which are about 7 to 7.5 inches long and cook with approximately fifty percent (50%) of the energy in the visible and near-visible light portion of the spectrum at full lamp power.

Door 4 has a cylindrically shaped interior surface 76 that, when the door is closed, maintains the cylindrical shape of the oven cavity 8. A window 78 is formed in the door 4 (and surface 76) for viewing foods while they cook. Window 78 is preferably curved to maintain the cylindrical shape of the oven cavity 8.

It has been discovered that by replacing the inner surfaces of the oven cavity with a material having a modest increase in reflectivity, that a substantial increase of oven efficiency results. Previous lightwave ovens use unpolished aluminum (having a reflectivity of about 80%), or polished, high-purity aluminum (such as the German brand Alanod having a reflectivity of about 90% (averaged in the wavelength range of interest from a 3000° K quartz tungsten-halogen lamp). While the reflectivity is the way the metal surfaces are specified, a more important parameter is the absorption (which equals 100%—reflectivity), since this relates directly to the loss of radiation that strikes the walls. In the present invention, the inner surface of cylinder sidewall 20, door inner surface 76 and reflective surfaces 30 and 50 are formed of a highly reflective material made from a thin layer of high reflecting silver sandwiched between two plastic layers and bonded to a metal sheet, having a total reflectivity of about 95%. Such a highly-reflective material is available from Alcoa under the tradename EverBrite 95, or from Material Science Corporation under the tradename Specular+SR. By increasing the reflectivity by about 5% over highly polished aluminum, the wall absorption has dropped from 10% to 5%, which is a factor of two. This means that there can be about double the number of reflections with the same total energy losses, so that there is a much greater probability of the food intercepting a multi-bounced light ray.

The plastic material of the sidewall 20 and door inner surface 76 can be pre-scratched or patterned so that scratches incurred during cleaning are hidden. It has been determined that for moderate pre-scratching, or patterning, the specularity of the surfaces remains substantially unchanged, and little effect has been noted on the efficiency of the oven.

The window portion 78 of the preferred embodiment is formed by bonding the two plastic layers surrounding the reflecting silver to a transparent substrate such as plastic or glass (preferably tempered), instead of sheet metal that forms the rest of the door's substrate. It has been discovered that the amount of light that leaks through the reflective material used to form the interior of the oven is ideal for safely and comfortably viewing the interior of the oven cavity while food cooks. The window 78 preferably should transmit about 0.1% of the incident light from the cavity 8, so that the user can safely view the food while it cooks.

Alternately, one could make the window 78 of two borosilicate (Pyrex) glass plates (about 3 mm thick), with the inner surfaces facing each other each being coated with a thin aluminum film having an approximate 600 angstrom thickness. However, the slight asymmetry of the cylindrical cavity caused by a flat window 78, along with second plate losses, may produce some loss to the efficiency of the oven.

The geometry of the oven cavity also has a strong influence on the overall oven efficiency. Specular walls imply a mirror-like property where the angle that light reflects from the surface is equal to the angle of incidence. In a rectangular box, any light rays reflected off of the food surface generally need at least three bounces to return to the food surface, and suffer absorption on every bounce.

However, it has been discovered that a cylinder with flat end-caps makes a surprisingly good oven cavity. Simple models of the cylindrical oven exhibit efficiencies as high as 65% for cylinders of 11 inch diameter with EverBrite 95 reflective surfaces. Equally important, it has been discovered that simple lamp configurations using linear tungsten halogen lamps produce very uniform illumination of the food position on the central axis of the cylinder. It was surprising to find that the diameter of the outside of the cylinder had relatively little influence on the efficiency of the oven or the illumination pattern uniformity at least over a range of cylinder diameters of 9 to 17 inches.

Tests using wall materials of various reflectivities reinforced the concept of the importance of high wall reflectivities for the cylindrical configuration. The following table illustrates the results of changing wall reflectivities in a test bed consisting of a simple cylindrical oven cavity with flat end plates and no glass shields:

| Materials | reflectivity | efficiency |
|---|---|---|
| Polished Stainless Steel | 70% | 28% |
| Alanod Aluminum | 90% | 53% |
| EverBrite 95 Silver | 95% | 65% |

The oven cavity can be formed with the cylinder longitudinal axis being oriented either horizontally or vertically. Both configurations have high efficiencies, and while the horizontal configuration offers better access with square and rectangular oven pans, the vertical configuration provides the best uniformity of illumination, and for most applications it is the preferred configuration.

The cylindrical side wall 20 is easy to form from a thin sheet of reflectorized metal, and this property makes it easy and inexpensive to produce oven walls (sidewall 20 and door interior surface 76) that are replaceable by a servicing agency or possibly the consumer himself. Easily replaced cavity walls can extend the lifetime of the oven. Further, the cylindrical configuration of the oven means there are no hard to clean corners in the oven.

Figure 4A:
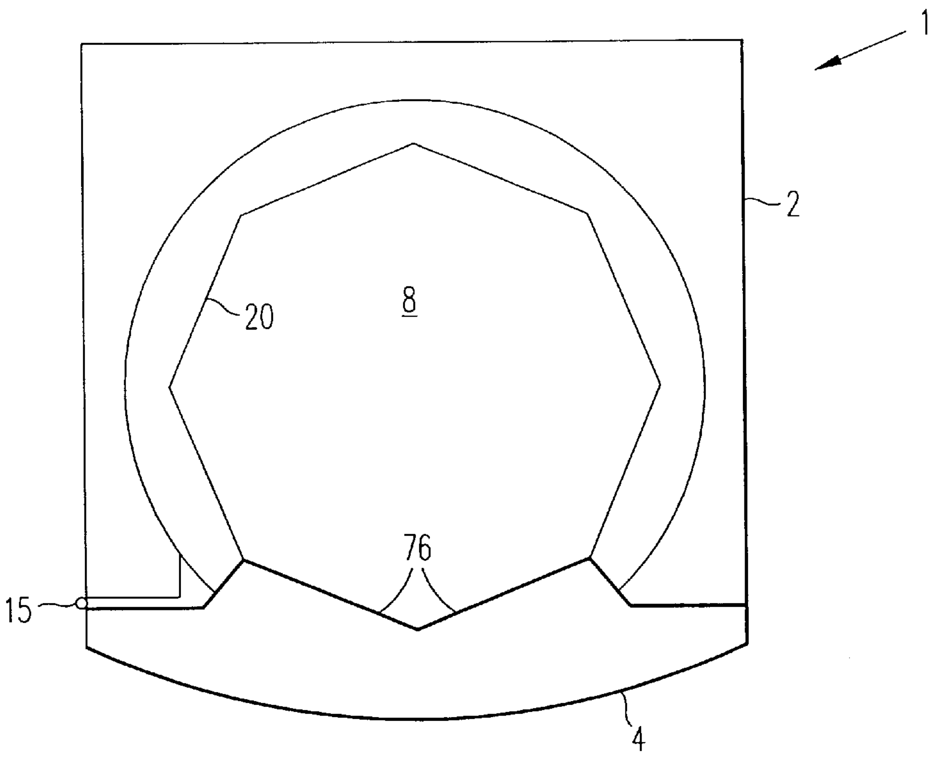
FIG. 4A is a top cross-sectional view of an alternate embodiment of the lightwave oven of the present invention.
Figure 4B:
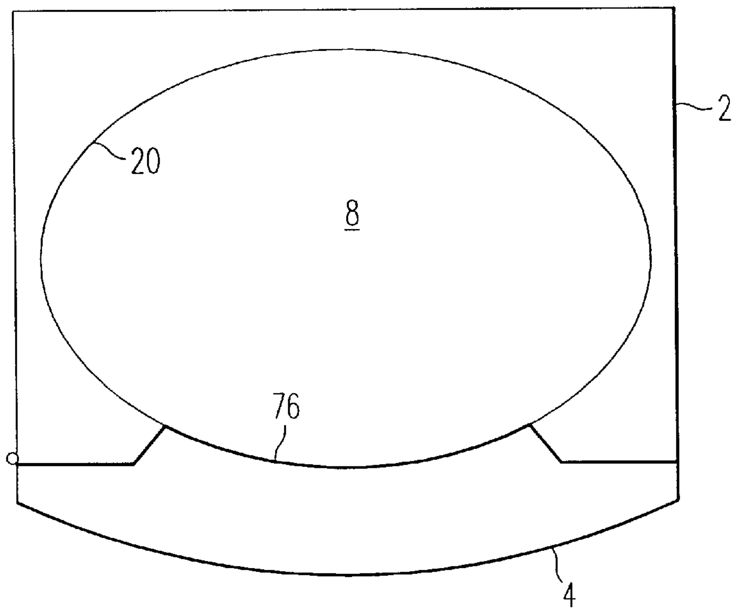
FIG. 4B is a top cross-sectional view of a second alternate embodiment of the lightwave oven of the present invention.

It should also be noted that cylindrical sidewall 20 need not have a perfect cylinder shape to provide enhanced efficiency, as illustrated in FIGS. 4A–4B. Octagonal mirror structures (FIG. 4A) have been used as an approximation to a cylinder, and have shown an increased efficiency over and above the rectangular box. In fact, any additional number of planar sides greater than the four of the standard box provides increased efficiency, and it is believed the maximum effect would accrue when the number of walls in such multi-walled configurations are pushed to their limit (i.e. the cylinder). The oven cavity can also have an elliptical cross-sectional shape (FIG. 4B), which has the advantage of fitting wider pan shapes into the cooking chamber compared to a cylindrical oven with the same cooking area.

Upper and lower reflector assemblies 22/24 provide a very uniform illumination field inside cavity 8, which eliminates the need to rotate the food for even cooking. A simple flat back-plane reflector behind the lamps would not give uniform illumination in a radial direction because the gap between the lamps increases as the distance from the center electrodes 32/52 increases. It has been discovered that this gap is effectively filled-in with lamp reflections from the channel sidewalls 46/66. FIGS. 2C and 3C illustrate the virtual lamp images 82/84 of one of the lamps 36/56, which fill in the spaces between the lamps near sidewall 20 with radiation directed into the oven cavity 8. From this it can be seen that the outer part of the cylinder field is effectively filled-in with the reflected lamp positions to give enhanced uniformity. Across this cylinder plane, a flat illumination has been produced within a variation of ±5% across a diameter of 12 inches measured 3 inches away from the lamp plane. For cooking purposes this variance shows adequate uniformity and a turntable is not necessary to cook food evenly.

The direct radiation from the lamps, combined with the reflections off of the non-planar reflecting surfaces 30/50, evenly irradiate the entire volume of the oven cavity 8. Further, any light missing the foodstuff, or reflected off of the foodstuff surface, is reflected by the cylindrical sidewall 20 and reflecting surfaces 30/50 so that the light is redirected back to the foodstuff.

Due to the proximity of lower reflector assembly 22 to the cooktop 74, lower reflector assembly 22 is taller than upper reflector assembly 24, and therefore channels 60/62 are deeper than channels 40/42. This configuration positions lower lamps 56–59 further away from cooktop 74 (upon which the foodstuff sits). The increased distance of cooktop 74 from lamps 56–59, and the deeper channels 60/62, were found necessary to provide more even cooking at cooktop 74.

It has been discovered that the combination of high-reflectivity specular walls (about 95%) and the cylindrical shape of oven cavity 8 makes it possible to cook food on an average of about twice as fast using a lamp power of about 1.8 KW as contrasted with a typical 240 volt built-in kitchen oven using a power of 3–5 KW. It should also be remembered that a conventional oven needs an additional preheat time of 15 to 20 minutes to bring the oven cavity to a stable temperature. Typical comparative cook times for this version of the 1.8 KW lightwave oven are:

| Food Item | 1.8 KW Cylindrical Oven (minutes) | Conventional Oven (minutes) |
|---|---|---|
| prawns | 3 | 6 |
| cookies (refrigerated) | 5–6 | 9–12 |
| steak (¾lb) | 6 | 10 |
| vegetables (asparagus) | 6 | 12–15 |
| biscuits (refrigerated) | 6–8 | 11–14 |
| french fries (frozen) | 7–9 | 11–23 |
| pizza (12 inch frozen) | 8 | 12–15 |
| cookies (frozen) | 11 | 20–24 |
| bread (1 lb loaf) | 12 | 25–30 |
| cake (angel food-mix) | 16 | 37–47 |
| chicken (whole-3.5 lb) | 30 | 70 |
| pie (9 inch frozen) | 32 | 65–75 |

Water vapor management, water condensation and airflow control in the cavity 8 can significantly affect the cooking of the food inside oven 1. It has been found that the cooking properties of the oven (i.e., the rate of heat rise in the food and the rate of browning during cooking) is strongly influenced by the water vapor in the air, the condensed water on the cavity sides, and the flow of hot air in the cylindrical chamber. Increased water vapor has been shown to retard the browning process and to negatively affect the oven efficiency. Therefore, the oven cavity 8 need not be sealed completely, to let moisture escape from cavity 8 by natural convection. Moisture removal from cavity 8 can be enhanced through forced convention. A fan 80, which can be controlled as part of the cooking formulas, provides a source of fresh air that is delivered to the cavity 8 to optimize the cooking performance of the oven.

Figure 5A:
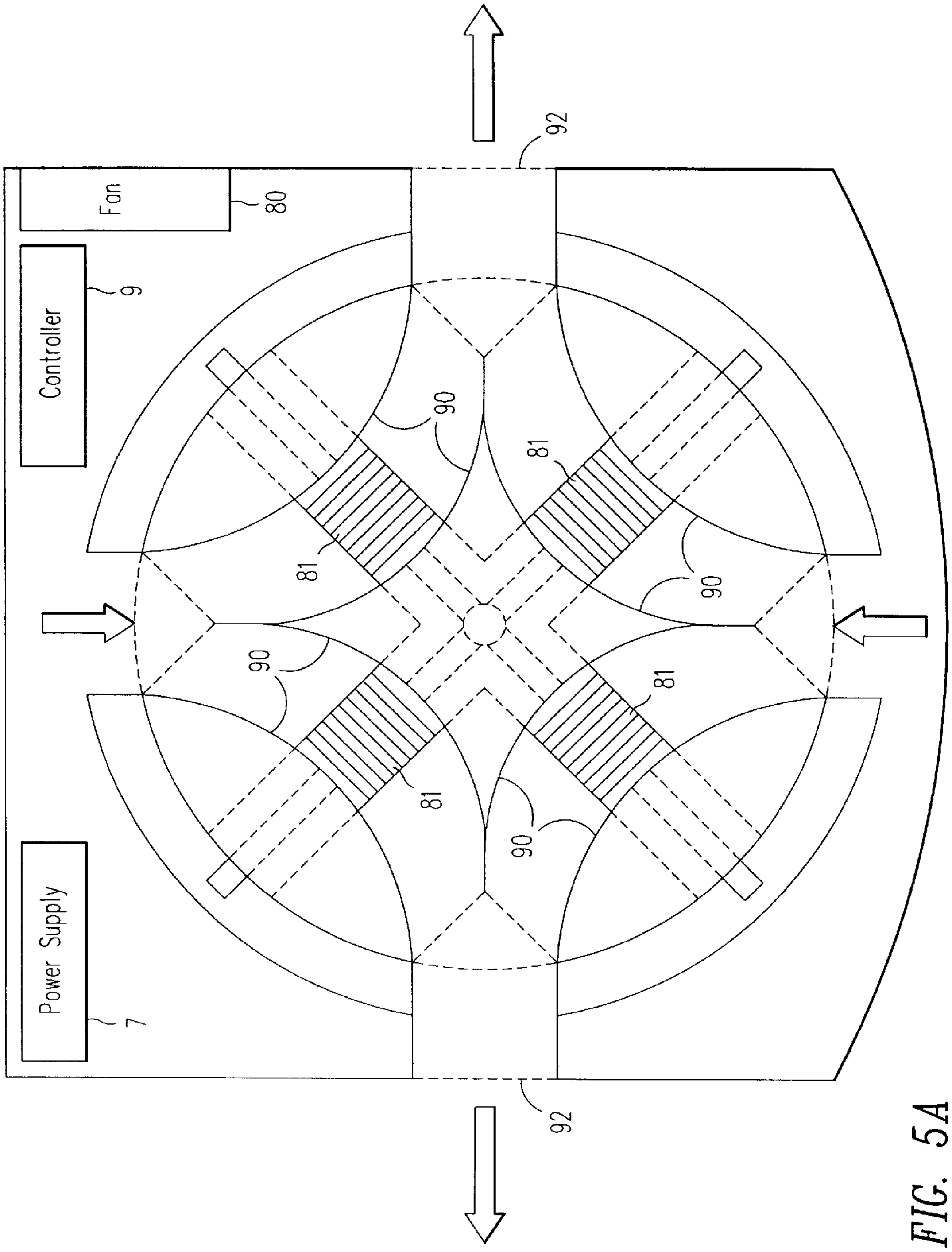
FIG. 5A is a top cross-sectional view of the upper portion of lightwave oven of the present invention.
Figure 5B:
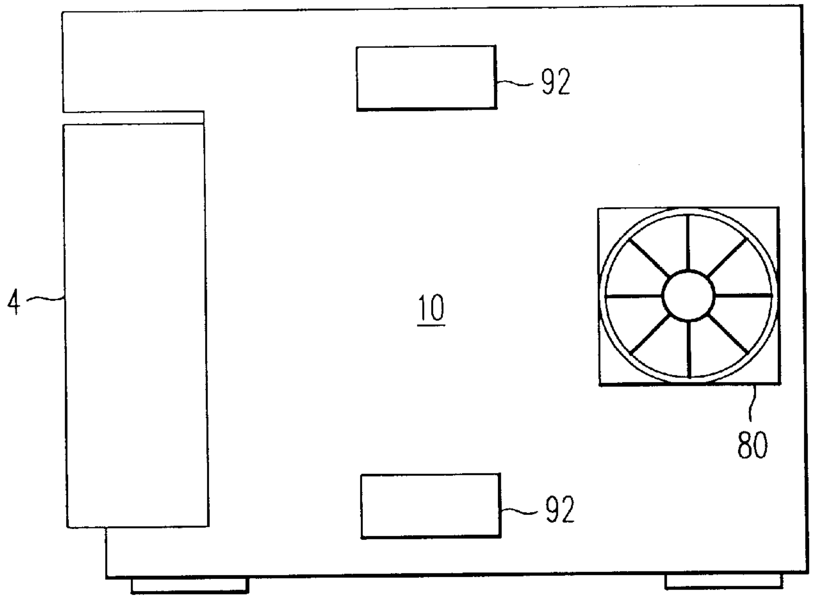
FIG. 5B is a side view of the housing for the lightwave oven of the present invention.

Fan 80 also provides fresh cool air that is used to cool the high reflectance internal surfaces of the oven cavity 8, as illustrated in FIGS. 5A and 5B. During operation, reflecting surfaces 30/50, and sidewall 20, if left uncooled, could reach very high temperatures that can damage these surfaces. Therefore, fan 80 creates a positive pressure within the oven housing 2 which, in effect, creates a large cooking air manifold. The pressure within the housing 2 causes cooling air to flow over the back surface of cylindrical sidewall 20 and into integral ducting 90 formed between each of the reflector assemblies 30/50 and the housing 2. It is most important to cool the back side portions of bottom wall 44/64 and sidewalls 46/66 that are in the closest proximity to the lamps. To enhance the cooling efficiency of these areas of reflector assemblies 24/26, cooling fins 81 are bonded to the backside of reflecting surfaces 30/50 and positioned in the airstream of cooling air flowing through ducting 90. The cooling air flows in through fan 80, over the back surface of cylindrical sidewall 20, through ducting 90, and out exhaust ports 92 located on the oven's sidewalls 10. The airflow from fan 80 can further be used to cool the oven power supply 7 and controller 9. FIG. 5A illustrates the cooling ducts for upper reflector assembly 22. Ducting 90 and fins 81 are formed under reflector assembly 24 in a similar manner.

One drawback to using the 95% reflective silver layer sandwiched between two plastic layers is that it has a lower heat tolerance than the 90% reflective high purity aluminum. This can be a problem for reflective surfaces 30 and 50 of the reflector assemblies 22/24 because of the proximity of these surfaces to the lamps. The lamps can possibly heat the reflective surfaces 30/50 above their damage threshold limit. One solution is a composite oven cavity, where reflective surfaces 30 and 50 are formed of the more heat resistant high purity aluminum, and the cylindrical sidewall reflective surface 20 is made of the more reflective silver layer. The reflective surfaces 30/50 will operate at higher temperatures because of the reduced reflectivity, but still well below the damage threshold of the aluminum material. In fact, the damage threshold is high enough that fins 81 probably are not necessary. This combination of reflective surfaces provides high oven efficiency while minimizing the risk of reflector surface damage by the lamps.

Figure 6:
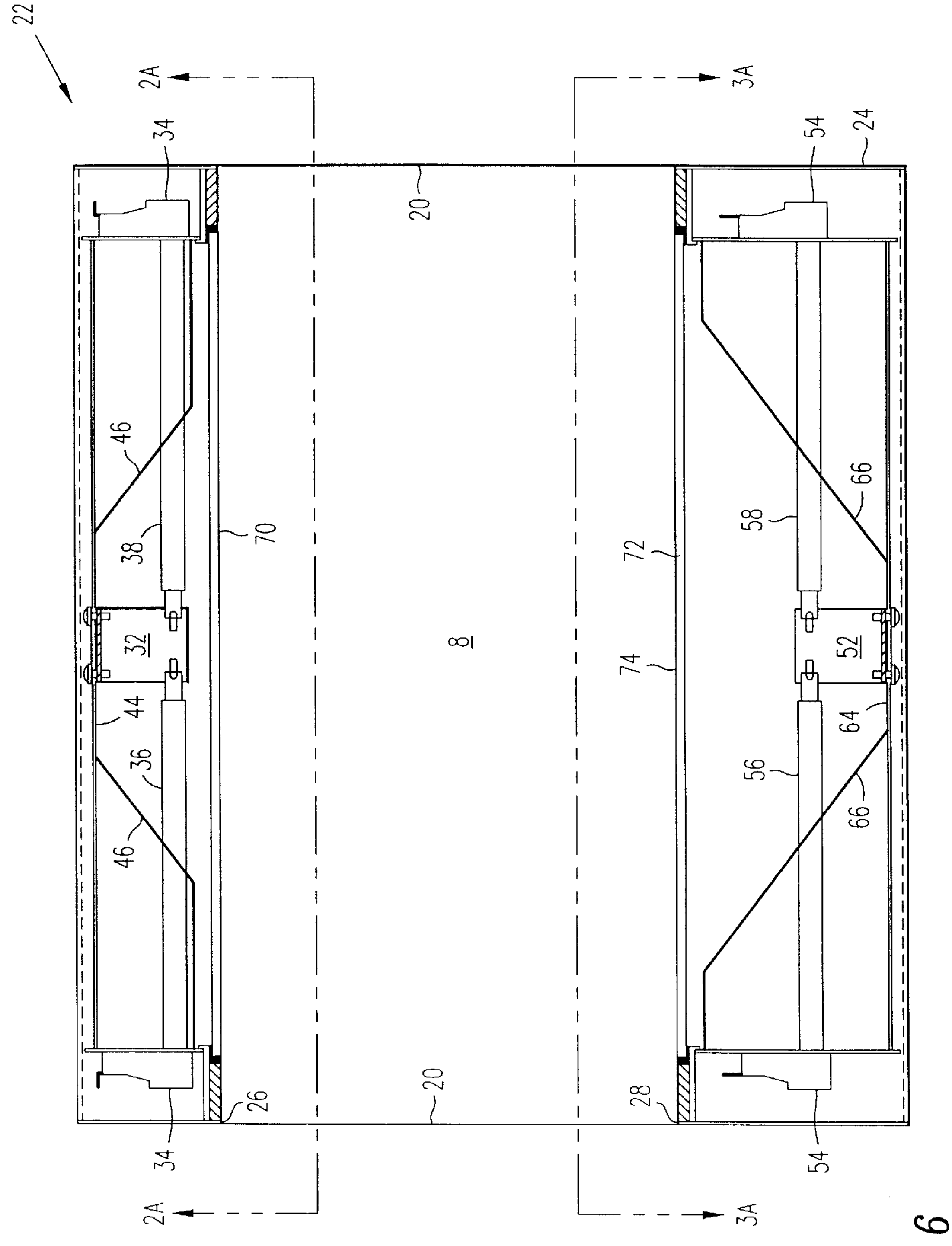
FIG. 6 is a side cross-sectional view of another alternate embodiment of the present invention.
Figure 7:
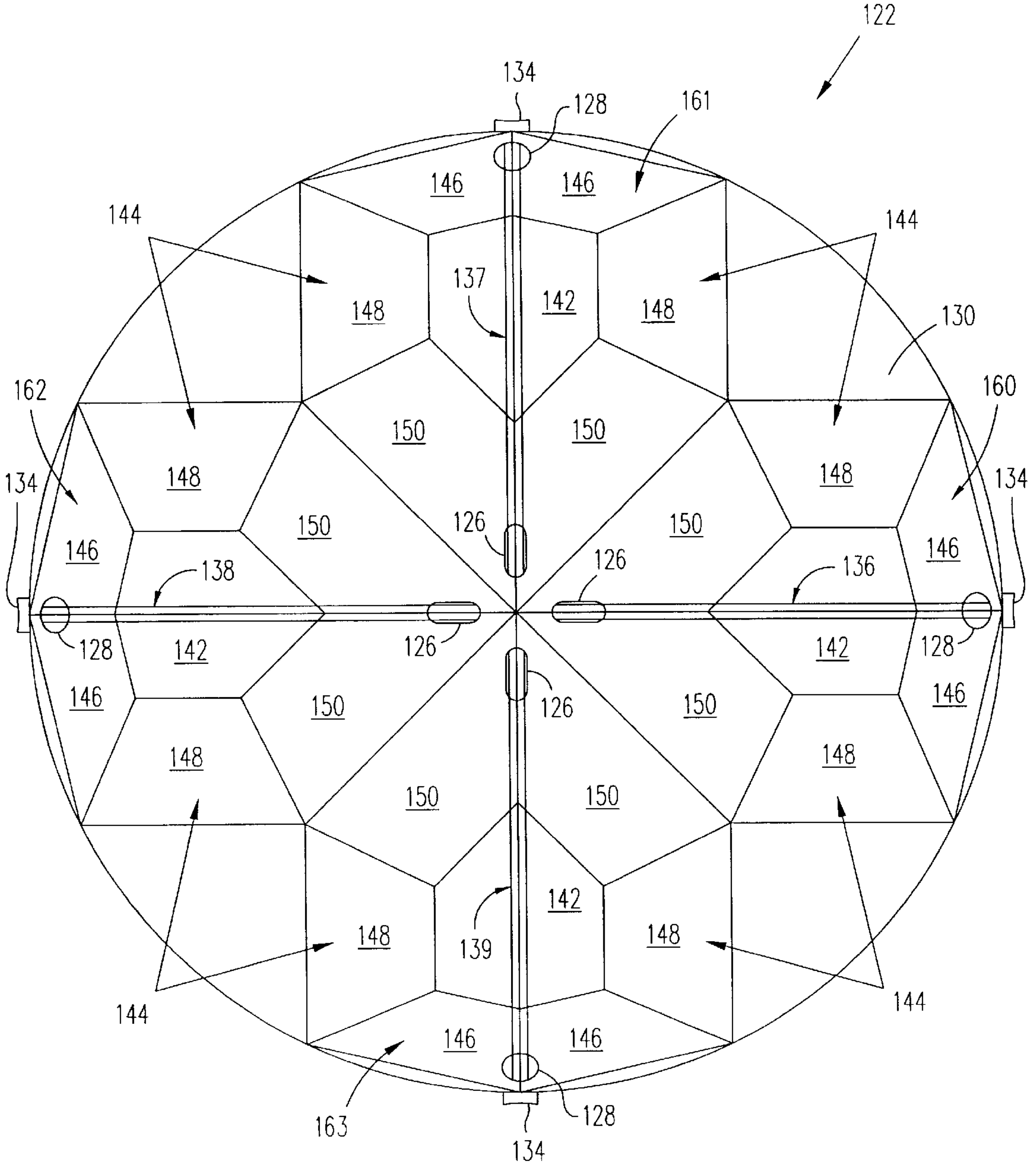
FIG. 7 is a top view of an alternate embodiment reflector assembly for the present invention, which includes reflector cups underneath the lamps.
Figure 8A:
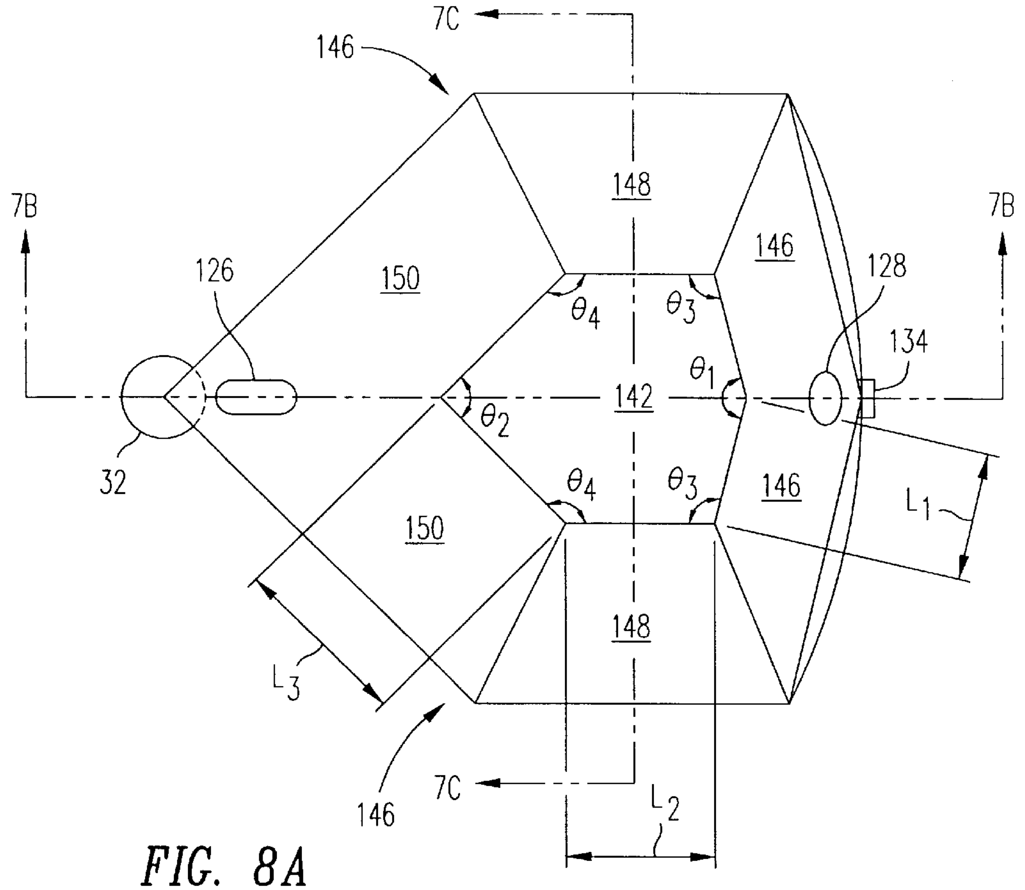
FIG. 8A is a top view of one of the reflector cups for the alternate embodiment reflector assembly of the present invention.
Figure 8B:
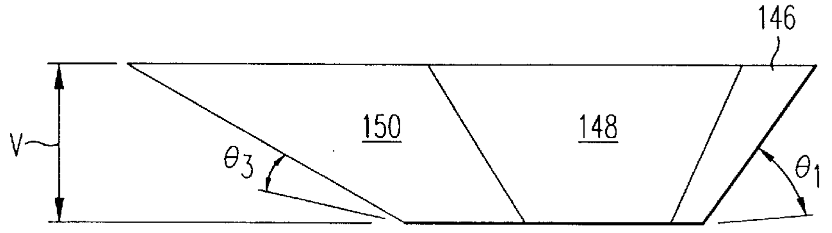
FIG. 8B is a side cross-sectional view of the reflector cup of FIG. 8A.
Figure 8C:
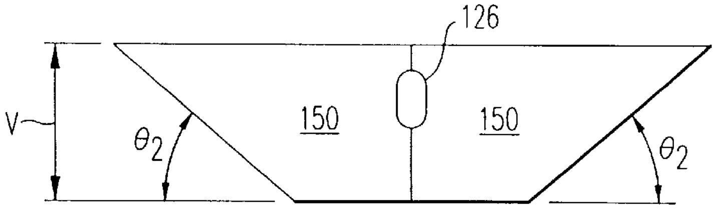
FIG. 8C is an end cross-sectional view of the reflector cup of FIG. 8A.

It should be noted that the shape or size of cavity 8 need not match the shape/size of upper/lower reflector assemblies 22/24. For example, the cavity 8 can have a diameter that is larger than that of the reflector assemblies, as illustrated in FIG. 6. This allows for a larger cooking area with little or no reduction in oven efficiency. Alternately, the cavity 8 can have an elliptical cross-section, with reflector assemblies 22/24 that are matched in shape (e.g. elliptical with channels 40/42, 60/62 not crossing perpendicular to each other), or have a more circular shape than the cavity 8.

A second reflector assembly embodiment 122 is illustrated in FIGS. 7 and 8A–8C that can be used instead of upper/lower reflector assembly designs 22/24 described above. Reflector assembly 122 includes a circular, non-planar reflecting surface 130 facing the oven cavity 8, a center electrode 132 disposed underneath the center of the reflecting surface 130, four outer electrodes 134 evenly disposed at the perimeter of the reflecting surface 130, and four lamps 136, 137, 138, 139 each radially extending from the center electrode 132 to one of the outer electrodes 134 and positioned at 90 degrees to the two adjacent lamps. The reflecting surface 30 includes reflector cups 160, 161, 162 and 163 each oriented at a 90 degree angle to the adjacent reflector cup. The lamps 136–39 are shown disposed inside of cups 160–163, but could also be disposed directly over cups 160–163. The lamps enter and exit each cup through access holes 126 and 128. The cups 160–163 each have a bottom reflecting wall 142 and a pair of shaped opposing sidewalls 144 best illustrated in FIGS. 8A and 8B. (Note that for bottom reflecting wall 142, "bottom" relates to its relative position with respect to cups 160–163 in their abstract, even though when installed facing downward wall 142 is above sidewalls 144.) Each sidewall 144 includes 3 planar segments 146, 148 and 150 that generally slope away from the opposing sidewall 144 as they extend away from the bottom wall 142. Therefore, there are seven reflecting surfaces that form each reflector cup 160–163: three from each of the two sidewalls 144 and the bottom reflecting wall 142.

The formation and orientation of the planar segments 146/148/150 is defined by the following parameters: the length L of each segment measured at the bottom wall 142, the angle of inclination $\theta$ of each segment relative to the bottom wall 142, the angular orientation $\Phi$ between adjacent segments, and the total vertical depth V of the segments. These parameters are selected to maximize efficiency and the evenness of illumination in the oven cavity 8. Each reflection off of reflecting surface 130 induces a 5% loss. Therefore, the planar segment parameters listed above are selected to maximize the number of light rays that are reflected by reflector assembly 122 1) one time only, 2) in a direction substantially perpendicular to the plane of the reflector assembly 122, and 3) in a manner that very evenly illuminates the oven cavity 8.

A pair of identical reflector assemblies 122 as described above have been made such that when installed to replace upper and lower reflector assemblies 22/24 above and below the oven cavity 8, excellent efficiency and uniform cavity illumination have been achieved. The reflector assembly 122 of the preferred embodiment has the following dimensions. The reflector assembly 122 has a diameter of about 14.7 inches, and includes 4 identically shaped reflector cups 160–163. Lengths $L_1$, $L_2$ and $L_3$ of segments 146, 148 and 150 respectively are about 1.9, 1.6, and 1.8 inches. The angles of inclination $\theta_1$, $\theta_2$, and $\theta_3$ for segments 146, 148 and 150 respectively are about 54°, 42° and 31°. The angular orientation $\Phi_1$ between the two segments 146 is about 148°, $\Phi_2$ between the two segments 150 is about 90°, $\Phi_3$ between segments 146 and 148 is about 106°, $\Phi_4$ between segments 148 and 150 is about 135°. The total vertical depth V of the sidewalls 144 is about 1.75 inches.

Figure 9:
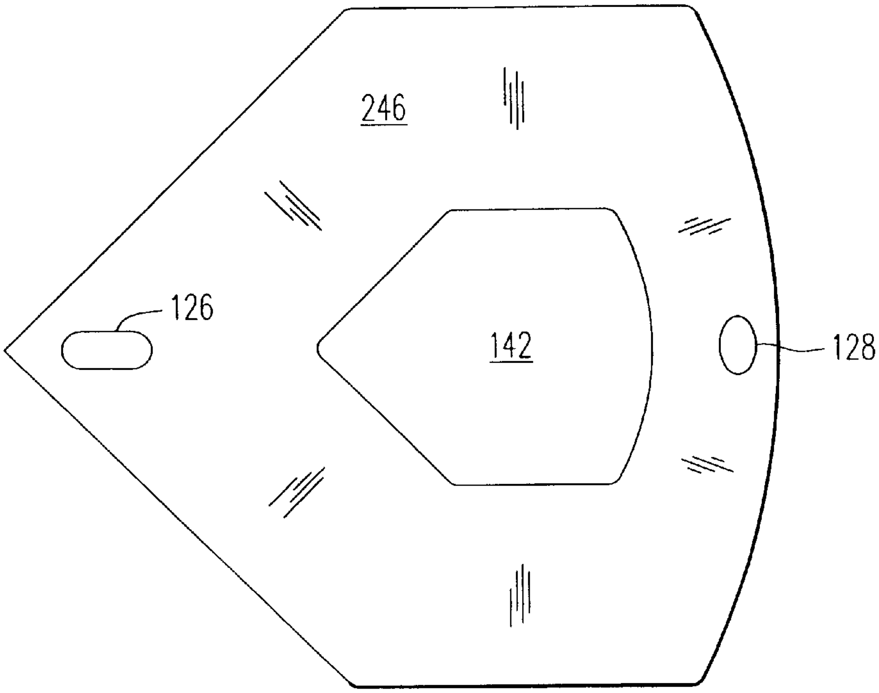
FIG. 9 is a top view of an alternate embodiment of the reflector cup of FIG. 8A.

While reflector assembly 122 is shown with three planar segments 146/148/150 for each side wall 144, greater or few segments can be used to form the reflecting cups 160–163 having a similar shape to the reflecting cups described above. In fact, a single non-planar shaped side wall 246 can be made that has a similar shape to the 6 segments that form the two sidewalls 144 of FIGS. 8A–8C, as illustrated in FIG. 9.

While all eight lamps could operate simultaneously at full power if an adequate electrical source was available, the lightwave oven of the preferred embodiment has been specifically designed to operate as a counter-top oven that plugs into a standard 120 VAC outlet. A typical home kitchen outlet can only supply 15 amps of electrical current, which corresponds to about 1.8 KW of power. This amount of power is sufficient to only operate two commercially available 1 KW tungsten halogen lamps at color temperatures of about 2900° K. Operating additional lamps all at significantly lower color temperatures is not an option because the lower color temperatures do not produce sufficient amounts of visible and near-visible light. However, the lamps can be sequentially operated, where different selected lamps from above and below the food can be sequentially switched on and off at different times to provide a uniform time-averaged power density of about 0.7 W/cm$^2$ without having more than two lamps operating at any given time. This power density cooks food about twice as fast as a conventional oven.

For example, one lamp above and one lamp below the cooking region can be turned on for a period of time (i.e. 15 seconds). Then, they are turned off and two other lamps are turned on for 15 seconds, and so on. By sequentially operating the lamps in this manner, a cooking region far too large to be evenly illuminated by only two lamps is in fact evenly illuminated when averaged over time using eight lamps with no more than two activated at once. Further, some lamps may be skipped or have operation times reduced to provide different amounts of energy to different portions of the food surface.

The oven of the present invention may also be used cooperatively with other cooking sources. For example, the oven of the present invention may include a microwave radiation source 170. Such an oven would be ideal for cooking a thick highly absorbing food item such as roast beef. The microwave radiation would be used to cook the interior portions of the meat and the infrared, near-visible and visible light radiation of the present invention would cook and brown the outer portions.

It is to be understood that the present invention is not limited to the embodiments described above and illustrated herein, but encompasses any and all variations falling within the scope of the appended claims. For example, it is within the scope of the present invention to: use a different number of lamps and reflecting channels or reflecting cups (e.g. 3 lamps above and 3 lamps below with reflecting channels/cups at 120 degrees to each other), use a non-cylindrically shaped sidewall which has approximately equivalent reflective properties of a cylinder, use lamps with different upper voltage and/or wattage ratings than the 1 KW and 120 V described above, use reflector assemblies having a shape or size that do not exactly match the shape/size of the oven cavity sidewall, designing the oven cavity and lamp configurations for full lamp operation above or below the 1.8 KW oven capacity discussed above, operating with greater or fewer than two lamps on at any given time, and even operating the oven on its side so that the cook surface is parallel to the sidewalls of the cavity and the reflector assemblies irradiate the cook surface from the sides.

What is claimed is:

1. A lightwave oven, comprising:

an oven cavity housing enclosing a cooking chamber therein, the oven cavity housing including:
  a top wall with a first non-planar reflecting surface facing the cooking chamber,
  a bottom wall with a second non-planar reflecting surface facing the cooking chamber, and
  a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and alone the top wall; and a second plurality of elongated high power lamps that provide radiant energy in the visible, near-visible and infrared ranges of the electromagnetic spectrum and are disposed adjacent to and along the bottom wall;

wherein the third reflecting surface of the sidewall has a substantially cylindrical shape.

2. A lightwave oven, comprising:

an oven cavity housing enclosing a cooking chamber therein, the oven cavity housing including:
  a top wall with a first non-planar reflecting surface facing the cooking chamber,
  a bottom wall with a second non-planar reflecting surface facing the cooking chamber, and
  a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall; and a second plurality of elongated high power lamps that provide radiant energy in the visible, near-visible and infrared ranges of the electromagnetic spectrum and are disposed adjacent to and along the bottom wall;

wherein the third reflecting surface of the sidewall has a substantially elliptical cross-section.

3. A lightwave oven, comprising:

an oven cavity housing enclosing a cooking chamber therein, the oven cavity housing including:
  a top wall with a first non-planar reflecting surface facing the cooking chamber,
  a bottom wall with a second non-planar reflecting surface facing the cooking chamber, and
  a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall; and a second plurality of elongated high power lamps that provide radiant energy in the visible, near-visible and infrared ranges of the electromagnetic spectrum and are disposed adjacent to and along the bottom wall;

wherein the third reflecting surface of the sidewall has a substantially octagonal cross-section.

4. A lightwave oven, comprising:

an oven cavity housing enclosing a cooking chamber therein, the oven cavity housing including:
  a top wall with a first non-planar reflecting surface facing the cooking chamber,
  a bottom wall with a second non-planar reflecting surface facing the cooking chamber, and
  a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall; and a second plurality of elongated high power lamps that provide radiant energy in the visible, near-visible and infrared ranges of the electromagnetic spectrum and are disposed adjacent to and along the bottom wall;

wherein the third reflecting surface of the sidewall is formed of at least five planar surfaces.

5. A lightwave oven, comprising:

an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall; and a second plurality of elongated high power lamps that provide radiant energy in the visible, near-visible and infrared ranges of the electromagnetic spectrum and are disposed adjacent to and along the bottom wall;

wherein the first and second reflecting surfaces are at least 90% reflective of the radiant energy of the first and second pluralities of lamps, and the third reflecting surface is at least 95% reflective of the radiant energy of the first and second pluralities of lamps.

6. A lightwave oven, an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall;

a second plurality of elongated high power lamps that provide radiant energy in the visible, near-visible and infrared ranges of the electromagnetic spectrum and are disposed adjacent to and along the bottom wall;

a first plurality of elongated channels are formed in the first reflecting surface of the top wall;

a second plurality of elongated channels are formed in the second reflecting surface of the bottom wall;

each of the first and second pluralities of elongated channels includes a reflecting bottom surface and a pair of opposing reflecting side surfaces that slope away from each other as the side surfaces extend away from the reflecting bottom surface;

each of the first plurality of lamps are disposed to extend alone and over the reflecting bottom surface of one of the first plurality of channels; and each of the second plurality of lamps are disposed to extend along and over the reflecting bottom surface of one of the second plurality of channels;

wherein each of the first plurality of lamps and first plurality of channels have a first end disposed at a central location of the top wall and extend radially toward an outer edge of the top wall, and each of the second plurality of lamps and second plurality of channels having a first end disposed at a central location of the bottom wall and extend radially toward an outer edge of the bottom wall.

7. A lightwave oven, comprising:

an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber;

a first plurality of elongated high power lamps that provide radiant energy in the visible, near-visible and infrared ranges of the electromagnetic spectrum and are disposed adjacent to and along the top wall;

a second plurality of elongated high power lamps that provide radiant energy in the visible, near-visible and infrared ranges of the electromagnetic spectrum and are disposed adjacent to and along the bottom wall;

a first plurality of reflector cups are formed in the first reflecting surface of the top wall;

a second plurality of reflector cups are formed in the second reflecting surface of the bottom wall;

each of the first and second pluralities of reflector cups include a reflecting bottom surface and a pair of shaped opposing reflecting side surfaces that generally slope away from each other as the side surfaces extend away from the reflecting bottom surface;

each of the first plurality of lamps are disposed to extend along and over the reflecting bottom surface of one of the first plurality of reflector cups;

each of the second plurality of lamps are disposed to extend along and over the reflecting bottom surface of one of the second plurality of reflector cups; and each of the shaped side surfaces has different portions with different angles of inclination relative to the reflecting bottom surface.

8. The lightwave oven of claim 7, wherein:

each of the first plurality of lamps has a first end disposed at a central location of the top wall and extends radially toward an outer edge of the top wall, and each of the second plurality of lamps has a first end disposed at a central location of the bottom wall and extends radially toward an outer edge of the bottom wall.

9. The lightwave oven of claim 5, further comprising:

a fan generating an air stream;

air ducts that direct the air stream along outer sides of the top and bottom walls.

10. The lightwave oven of claim 5, wherein the sidewall includes a removable door portion providing access to the cooking chamber, and containing a partially transparent window.

11. The lightwave oven of claim 5, further comprising:

a first transparent shield member disposed between the first plurality of lamps and the oven chamber a second transparent shield member disposed between the second plurality of lamps and the oven chamber, wherein the second transparent shield member serves as a cooktop for food placed in the oven chamber.

12. The lightwave oven of claim 5, further comprising a microwave radiation source.

13. A lightwave oven, comprising:

an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber, the sidewall has a cylindrical shape or a cross-section that is elliptical or polygonal having at least five planar sides;

a first plurality of elongated high power lamps that provide radiant energy in the visible, near-visible and infrared ranges of the electromagnetic spectrum and are disposed adjacent to and along the top wall; and a second plurality of elongated high power lamps that provide radiant energy in the visible, near-visible and infrared ranges of the electromagnetic spectrum and are disposed adjacent to and along the bottom wall;

wherein the first and second reflecting surfaces are at least 90% reflective of the radiant energy of the first and second pluralities of lamps, and the third reflecting surface is at least 95% reflective of the radiant energy of the first and second pluralities of lamps.

14. The lightwave oven of claim 13, wherein:

a first plurality of elongated channels are formed in the first reflecting surface of the top wall;

a second plurality of elongated channels are formed in the second reflecting surface of the bottom wall;

each of the first and second pluralities of elongated channels includes a reflecting bottom surface and a pair of opposing reflecting side surfaces that slope away from each other as the side surfaces extend away from the reflecting bottom surface;

each of the first plurality of lamps are disposed to extend along and over the reflecting bottom surface of one of the first plurality of channels; and each of the second plurality of lamps are disposed to extend along and over the reflecting bottom surface of one of the second plurality of channels.

15. A lightwave oven, comprising:

an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber, the sidewall has a cross-section that is circular, elliptical, or polygonal having at least five planar sides;

a first plurality of elongated high power lamps that provide radiant energy in the visible, near-visible and infrared ranges of the electromagnetic spectrum and are disposed adjacent to and along the top wall;

a second plurality of elongated high power lamps that provide radiant energy in the visible, near-visible and infrared ranges of the electromagnetic spectrum and are disposed adjacent to and along the bottom wall;

wherein the first and second reflecting surfaces are at least 90% reflective of the radiant energy of the first and second pluralities of lamps, and the third reflecting surface is at least 95% reflective of the radiant energy of the first and second pluralities of lamps;

a first plurality of elongated channels are formed in the first reflecting surface of the top wall;

a second plurality of elongated channels are formed in the second reflecting surface of the bottom wall;

each of the first and second pluralities of elongated channels includes a reflecting bottom surface and a pair of opposing reflecting side surfaces that slope away from each other as the side surfaces extend away from the reflecting bottom surface;

each of the first plurality of lamps are disposed to extend along and over the reflecting bottom surface of one of the first plurality of channels;

each of the second plurality of lamps are disposed to extend along and over the reflecting bottom surface of one of the second plurality of channels;

each of the first plurality of lamps and first plurality of channels have a first end disposed at a central location of the top wall and extend radially toward an outer edge of the top wall, and each of the second plurality of lamps and second plurality of channels having a first end disposed at a central location of the bottom wall and extend radially toward an outer edge of the bottom wall.

16. A lightwave ovens, comprising:

an oven cavity housing enclosing a cooking chamber therein, the oven cavity housing including:

a top wall with a first non-planar reflecting surface facing the cooking chamber, a bottom wall with a second non-planar reflecting surface facing the cooking chamber, and a sidewall with a third reflecting surface that surrounds and faces the cooking chamber, the sidewall has a cross-section that is circular, elliptical, or polygonal having at least five planar sides;

a first plurality of elongated high power lamps that provide radiant energy in the visible, near-visible and infrared ranges of the electromagnetic spectrum and are disposed adjacent to and along the top wall;

a second plurality of elongated high power lamps that provide radiant energy in the visible, near-visible and infrared ranges of the electromagnetic spectrum and are disposed adjacent to and along the bottom wall;

wherein the first and second reflecting surfaces are at least 90% reflective of the radiant energy of the first and second pluralities of lamps, and the third reflecting surface is at least 95% reflective of the radiant energy of the first and second pluralities of lamps;

a first plurality of reflector cups are formed in the first reflecting surface of the top wall;

a second plurality of reflector cups are formed in the second reflecting surface of the bottom wall;

each of the first and second pluralities of reflector cups include a reflecting bottom surface and a pair of shaped opposing reflecting side surfaces that generally slope away from each other as the side surfaces extend away from the reflecting bottom surface;

each of the first plurality of lamps are disposed to extend along and over the reflecting bottom surface of one of the first plurality of reflector cups;

each of the second plurality of lamps are disposed to extend along and over the reflecting bottom surface of one of the second plurality of reflector cups; and each of the shaped side surfaces has different portions with different angles of inclination relative to the reflecting bottom surface.

17. The lightwave oven of claim 16, wherein:

each of the first plurality of lamps has a first end disposed at a central location of the top wall and extends radially toward an outer edge of the top wall, and each of the second plurality of lamps has a first end disposed at a central location of the bottom wall and extends radially toward an outer edge of the bottom wall.

18. The lightwave oven of claim 13, further comprising:

a fan generating an air stream;

air ducts that direct the air stream along outer sides of the top and bottom walls.

19. The lightwave oven of claim 16, wherein the sidewall includes a removable door portion providing access to the cooking chamber, and containing a partially transparent window.

20. The lightwave oven of claim 13, further comprising:

a first transparent shield member disposed between the first plurality of lamps and the oven chamber a second transparent shield member disposed between the second plurality of lamps and the oven chamber, wherein the second transparent shield member serves as a cooktop for food placed in the oven chamber.

21. The lightwave oven of claim 13, further comprising a microwave radiation source.

* * * * *